US010469470B2

(12) United States Patent
Stojanovski et al.

(10) Patent No.: US 10,469,470 B2
(45) Date of Patent: **\*Nov. 5, 2019**

(54) SYSTEMS, METHODS AND DEVICES FOR DIRECT COMMUNICATION

(71) Applicant: INTEL IP CORPORATION, Santa Clara, CA (US)

(72) Inventors: Alexandre Stojanovski, Paris (FR); Muthaiah Venkatachalam, Beaverton, OR (US); Ana Lucia A. Pinheiro, Breinigsville, PA (US); Farid Adrangi, Lake Oswego, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,772

(22) Filed: May 30, 2017

(65) Prior Publication Data

US 2018/0013737 A1 Jan. 11, 2018

Related U.S. Application Data

(63) Continuation of application No. 14/751,436, filed on Jun. 26, 2015, now Pat. No. 9,699,153.

(Continued)

(51) Int. Cl.
*H04L 29/06* (2006.01)
*H04L 29/08* (2006.01)
(Continued)

(52) U.S. Cl.
CPC .......... *H04L 63/061* (2013.01); *H04L 9/3247* (2013.01); *H04L 63/0428* (2013.01);
(Continued)

(58) Field of Classification Search
CPC ..... H04L 63/061; H04L 69/324; H04L 67/04; H04L 63/0428; H04L 63/0876;
(Continued)

(56) References Cited

U.S. PATENT DOCUMENTS 6,658,022 B1 * 12/2003 West ................... H04L 12/6418
370/410
7,813,310 B2 * 10/2010 Song ..................... H04H 20/30
370/312

(Continued)

OTHER PUBLICATIONS

"IEEE Trial-Use Standards for Wireless Access in Vehicular Environments (WAVE)—Multi-channel Operation", IEEE Std 1609.4, Nov. 29, 2006, 83 pages.

(Continued)

*Primary Examiner* — Mohammad A Siddiqi
(74) *Attorney, Agent, or Firm* — Stoel Rives LLP

(57) ABSTRACT

Device to device (D2D) communication can be performed with packet data convergence protocol (PDCP) based encapsulation without internet protocol (IP) addressing. The non-IP D2D PDCP-encapsulated communication can further include two forms of secure data transfer. A first non-IP D2D PDCP-encapsulated communication can be a negotiated non-IP D2D PDCP-encapsulated communication. A second non-IP D2D PDCP-encapsulated communication can be a non-negotiated non-IP D2D communication. The non-negotiated non-IP D2D PDCP-encapsulated communication can include a common key management server (KMS) version and a distributed KMS version. The encapsulated communication can be used with various protocols, including a PC5 protocol (such as the PC5 Signaling Protocol) and wireless access in vehicular environments (WAVE) protocols.

20 Claims, 19 Drawing Sheets

Related U.S. Application Data

(60) Provisional application No. 62/140,926, filed on Mar. 31, 2015, provisional application No. 62/105,000, filed on Jan. 19, 2015.

(51) Int. Cl.
  *H04L 9/32* (2006.01)
  *H04W 80/02* (2009.01)
  *H04W 12/04* (2009.01)
  *H04W 76/14* (2018.01)
  *H04W 4/70* (2018.01)

(52) U.S. Cl.
  CPC ............ *H04L 63/06* (2013.01); *H04L 63/168* (2013.01); *H04L 67/04* (2013.01); *H04L 67/12* (2013.01); *H04L 69/02* (2013.01); *H04L 69/324* (2013.01); *H04W 12/04* (2013.01); *H04W 76/14* (2018.02); *H04W 80/02* (2013.01); *H04L 63/0876* (2013.01); *H04L 2209/24* (2013.01); *H04L 2209/72* (2013.01); *H04W 4/70* (2018.02)

(58) Field of Classification Search
  CPC ..... H04L 63/168; H04L 9/3247; H04L 63/06; H04L 69/02; H04L 67/12; H04L 2209/24; H04L 2209/72; H04W 12/04; H04W 76/023; H04W 80/02; H04W 4/005
  See application file for complete search history.

(56) References Cited

U.S. PATENT DOCUMENTS

| | | | | |
|---|---|---|---|---|
| 8,774,033 | B2* | 7/2014 | Oh ..................... | H04W 74/0833 370/252 |
| 9,049,024 | B2 | 6/2015 | Sundaram et al. | |
| 9,699,153 | B2* | 7/2017 | Stojanovski .......... | H04L 63/061 |
| 9,699,154 | B2* | 7/2017 | Stojanovski .......... | H04L 63/061 |
| 9,948,417 | B2* | 4/2018 | Kwon ..................... | H04H 20/59 |
| 2003/0012159 | A1* | 1/2003 | Vassilovski ............. | H04L 63/08 370/335 |
| 2005/0148334 | A1* | 7/2005 | Peeters ............... | H04M 1/6091 455/436 |
| 2007/0109105 | A1* | 5/2007 | Ohno ..................... | G07C 5/008 340/425.5 |
| 2007/0115868 | A1* | 5/2007 | Chen ...................... | G08G 1/163 370/315 |
| 2008/0186969 | A1* | 8/2008 | Klish .................. | H04L 63/0485 370/392 |
| 2013/0322626 | A1* | 12/2013 | Yang ..................... | H04L 63/123 380/255 |
| 2015/0092710 | A1 | 4/2015 | Novlan | |
| 2015/0305012 | A1 | 10/2015 | Yi et al. | |
| 2015/0327240 | A1 | 11/2015 | Yamada et al. | |
| 2016/0044727 | A1 | 2/2016 | Zisimopoulos et al. | |
| 2016/0080531 | A1 | 3/2016 | Agiwal | |
| 2016/0135217 | A1* | 5/2016 | Lee ........................ | H04L 47/30 370/329 |
| 2016/0174276 | A1 | 6/2016 | Lee et al. | |
| 2016/0219133 | A1* | 7/2016 | Kwon ................. | H04L 65/4076 |
| 2016/0227490 | A1* | 8/2016 | Yang ................... | H04W 52/281 |
| 2016/0234874 | A1 | 8/2016 | Jung | |

OTHER PUBLICATIONS

U.S. Appl. No. 14/751,436, Non-Final Office Action, dated Aug. 24, 2016, 39 pages.
U.S. Appl. No. 14/751,436, Notice of Allowance, dated Mar. 7, 2017, 17 pages.
U.S. Appl. No. 14/751,546, Notice of Allowance, dated Mar. 8, 2017, 17 pages.
U.S. Appl. No. 14/781,546, Non-Final Office Action, dated Aug. 25, 2016, 33 pages.
3GPP TS 33303, "3rd Generation Partnership Project; Technical Specification Group Services and System Aspects; Proximity-based Services (ProSe); Security aspects", (Release 12) V12.2.0, Dec. 2014, 64 pages.
3GPP TS 36323, "3rd Generation Partnership Project; Technical Specification Group Radio Access Network; Evolved Universal Terrestrial Radio Access (E-UTRA); Packet Data Convergence Protocol (PDCP) specification", (Release 12) V12.2.0, Dec. 2014, 30 pages.
3GPP TS 36323, "Technical Specification Group Radio Access Network; Evolved Universal Terrestrial Radio Access E-UTRA); Packet Data Convergence Protocol (PDCP) specification (Release 12)", Version 12.1.0, Sep. 2014, 28 pages.
CESG, "Identity Solution for ProSe group communications", S3-131034, 3GPP TSG SA WG3 (Security) Meeting #73, San Francisco, California, USA, Agenda Item 7.13, 7.14, Nov. 11-15, 2013, 7 pages.
Intel, "Protocol stack for PC5 Control Plane", S2-144285, SA WG2 Meeting #106, San Francisco, California, US, Agenda Item 7.13, Nov. 17-21, 2014, 5 pages.
Intel Corporation, "PC5 Signaling Protocol for discovery", R2-151113, 3GPP TSG-RAN WG2 #89bis, Bratislava, Slovakia, Agenda Item 7.5.3, Apr. 20-24, 2015, 5 pages.
Kaiserwerth, "A Parallel Implementation of the ISO 8802-2.2 Protocol", IBM Research Division, Zurich Research Laboratory, Communications for Distributed Application and Systems, Chapel Hill [Proceedings of the Conference on Communications Software. (Tricomm)], New York, IEEE, US, vol. Conf. 4, Apr. 18, 1991, pp. 75-88.
Motorola Solutions, "Solution for Identifiers used in ProSe Direct Discovery", S2-132862, SA WG2 Meeting #S2-98, Valencia, Spain, Agenda Item 6.4, Jul. 15-19, 2013, 4 pages.
PCT/US2015/056179, International Search Report and Written Opinion, dated Apr. 26, 2016, 19 pages.
PCT/US2015/056179, Invitation to Pay Additional Fees and Partial Search Report, dated Feb. 15, 2016, 10 pages.
PCT/US2015/057371, International Search Report and Written Opinion, dated Apr. 26, 2016, 18 pages.
PCT/US2015/057371, Invitation to Pay Additional Fees and Partial Search Report, dated Feb. 15, 2016, 9 pages.
Qualcomm Incorporated, "Introduction of ProSe Direct Communication", R2-145305, Change Request, 3GPP TSG-RAN WG2 #88, San Francisco, California, US, Nov. 17-21, 2014, 11 pages.
Sherif, et al., "X.25 Conformance Testing—a Tutorial", IEEE Communications Magazine, vol. 24, No. 1, Jan. 1986, pp. 16-27.
3GPP TR 23.713, "3rd Generation Partnership Project; Technical Specification Group Services and System Aspects; Study on extended architecture support for Proximity-based services (Release 13)" V0.3.0, Nov. 2014, 40 pages.
Groves, "Sakai-Kasahara Key Encryption (SAKKE)", Internet Engineering Task Force (IETF), Request for Comments: 6508, Category: Informational; ISSN: 2070/1721, Feb. 2012, 21 pages.

* cited by examiner

SYSTEMS, METHODS AND DEVICES FOR DIRECT COMMUNICATION

RELATED APPLICATION

This application is a continuation of U.S. patent application Ser. No. 14/751,436, filed Jun. 26, 2015, which claims the benefit under 35 U.S.C. § 119(e) of U.S. Provisional Application No. 62/105,000 filed Jan. 19, 2015 and U.S. Provisional Application No. 62/140,926 filed Mar. 31, 2015, both which are incorporated by reference herein in their entirety.

TECHNICAL FIELD

The present disclosure relates to wireless communication and more specifically to direct communication between devices using encapsulation.

DETAILED DESCRIPTION

Figure 1:
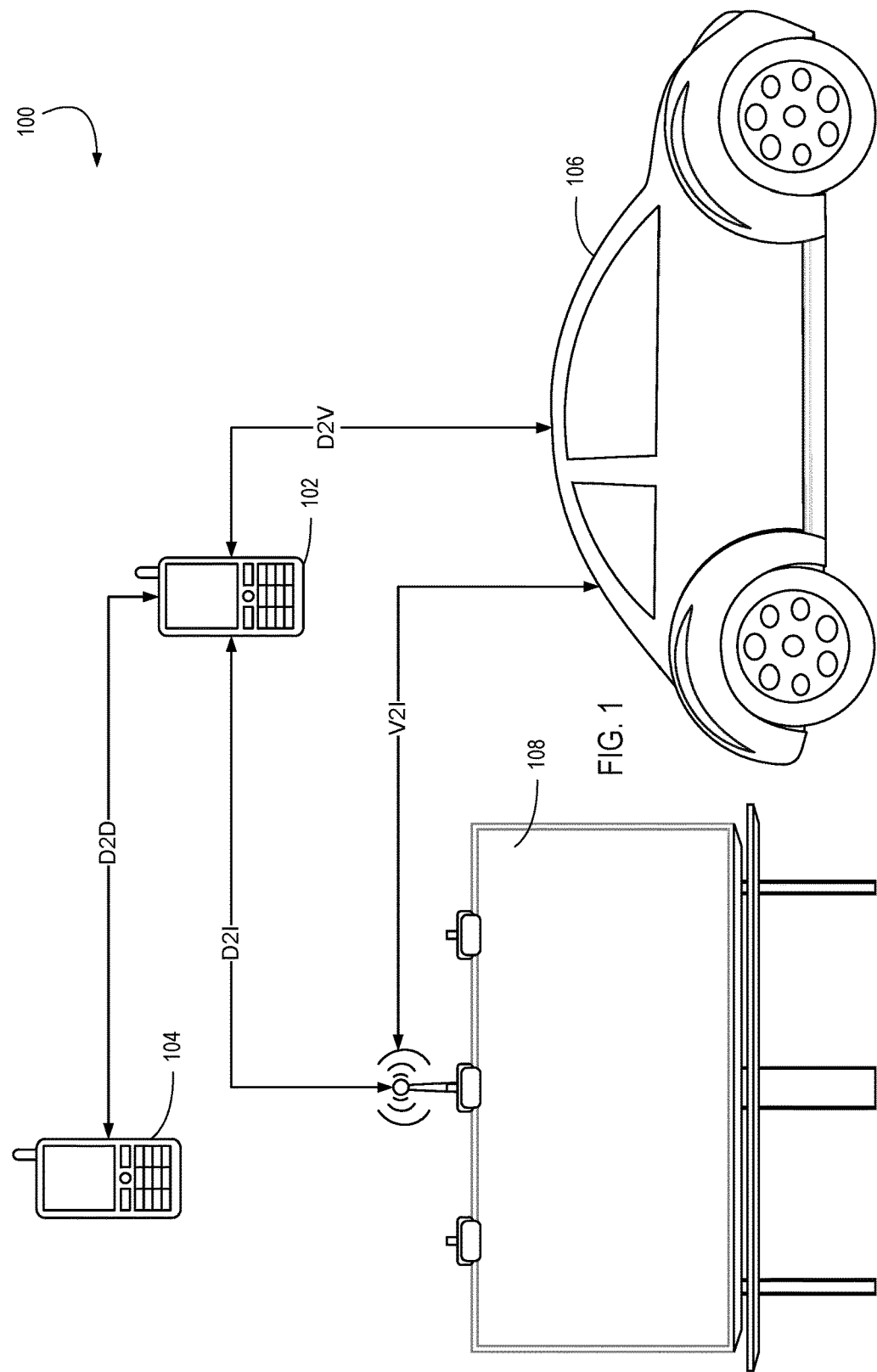
FIG. 1 is a schematic diagram illustrating a direct communication system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable device to device (D2D) communication using a packet data convergence protocol (PDCP)-based encapsulation without internet protocol (IP) addressing. The non-IP D2D PDCP-encapsulated communication can further include two forms of secure data transfer. A first non-IP D2D PDCP-encapsulated communication can be a negotiated non-IP D2D PDCP-encapsulated communication. A second non-IP D2D PDCP-encapsulated communication can be a non-negotiated non-IP D2D communication. The non-negotiated non-IP D2D PDCP-encapsulated communication can include a common key management server (KMS) version and a distributed KMS version. The encapsulated communication can be used with various protocols, including PC5 and wireless access in vehicular environments (WAVE) protocols.

For example, a PDCP header includes a service data unit type (SDU type). The SDU type can define a new SDU type to include a PC5 protocol (such as the PC5 Signaling Protocol). The PDCP header can use the new PC5 protocol type to indicate that a PC5 protocol will be used that does not require IP address support. Instead, a layer-2 ID (e.g., a PC5 MAC-layer identifier) can be used. A transmitting UE can send a Direct Communication Request message to a receiving UE. The receiving UE can perform an authentication procedure to allow a secure layer-2 link over PC5. The transmitting UE can then send user data inside a PC5 protocol message (e.g., a User Data message) as a payload.

In another example, an SDU type can be modified to include a logical link control/sub-network access protocol (LLC/SNAP) type. LLC/SNAP encapsulation can then be used to identify in the ethertype field that a PC5 protocol (such as the PC5 Signaling Protocol) will be used. A transmitting UE and receiving UE are configured for use of identity-based cryptography and depend on a common root of trust. The transmitting UE learns of the layer 2 ID and public identity information of a receiving UE. The transmitting UE constructs a PC5 Datagram message using the public identity information, Elliptic Curve-based Certificateless Signatures for Identity-based Encryption (ECCSI) signature, Sakai-Kasahara Key Encryption (SAKKE) payload and user data encrypted with a key in the SAKKE payload. The transmitting UE sends the PC5 Datagram message encapsulated by LLC/SNAP over PDCP to the receiving UE.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Transmission of data between two devices (two UEs) can be done using IP transport. Release 12 of 3GPP device to device (D2D) (aka Proximity Services—ProSe)) specifications supports IP-based communication [3GPP TR 23.303, 36.300]. However, in some cases, usage of IP is not an optimal approach. For example, a small device is used for machine to machine communication. The small device may not support IP as it is determined to be too costly in terms of implementation. In another example, the data to be transmitted is so small that the overhead of the IP header cannot be justified.

Data transmission of non-IP packets can occur between two devices, such as through a user plane transmission (e.g., packets are transmitted in the user plane as PDCP SDUs). In addition, data can be transmitted between two devices by piggybacking a packet into a signaling message over a PC5 protocol (such as the PC5 Signaling Protocol). This approach 1) does not require an IP header overhead needed by the current solution, 2) does not require the addition of a new SDU type in PDCP, and 3) re-uses the PC5 Signaling Protocol 3GPP TR 23.713.

In FIG. 1, non-IP D2D PDCP-encapsulated communications are shown in an environment 100 between multiple types of devices. Non-IP D2D PDCP-encapsulated communications can be classified based on what is communicating. While D2D describes the generic system (such as between a mobile device 102 and a mobile device 104), other specific embodiments are included under the D2D definition. For example, device to infrastructure (D2I) communications occur between the mobile device 102 and a stationary system, such as an enhanced road sign 108 that includes a Road Side Unit (RSU). In another example, device to vehicle (D2V) communications occur between the mobile device 102 and a vehicle 106. In one example, vehicle to infrastructure (V2I) communications occur between the vehicle 106 and a stationary system, such as the enhanced road sign 108 that includes an RSU. In an example, non-IP D2D PDCP-encapsulated communications are between home sensors such as a cell phone controlling a refrigerator. In one example, home appliances (e.g., washing machine, dryer, air conditioning) are being controlled by a power box based on current power utilization in the power grid using non-IP D2D PDCP-encapsulated communications. Other intercommunication examples are possible and contemplated, some of which are further described below.

Non-IP D2D PDCP-encapsulated communications can re-use the PC5 Signaling Protocol [TR 23.713] or other PC5 protocol to enable the communication between devices. By reusing PC5-signaling device complexity can be reduced as the device does not need to support IP. Non-IP D2D PDCP-encapsulated communications do not require an IP header overhead. Non-IP D2D PDCP-encapsulated communications can eliminate the overhead of IP address allocation during link establishment. Non-IP D2D PDCP-encapsulated communications do not require the addition of a new SDU type in PDCP, but can use one.

Figure 2:
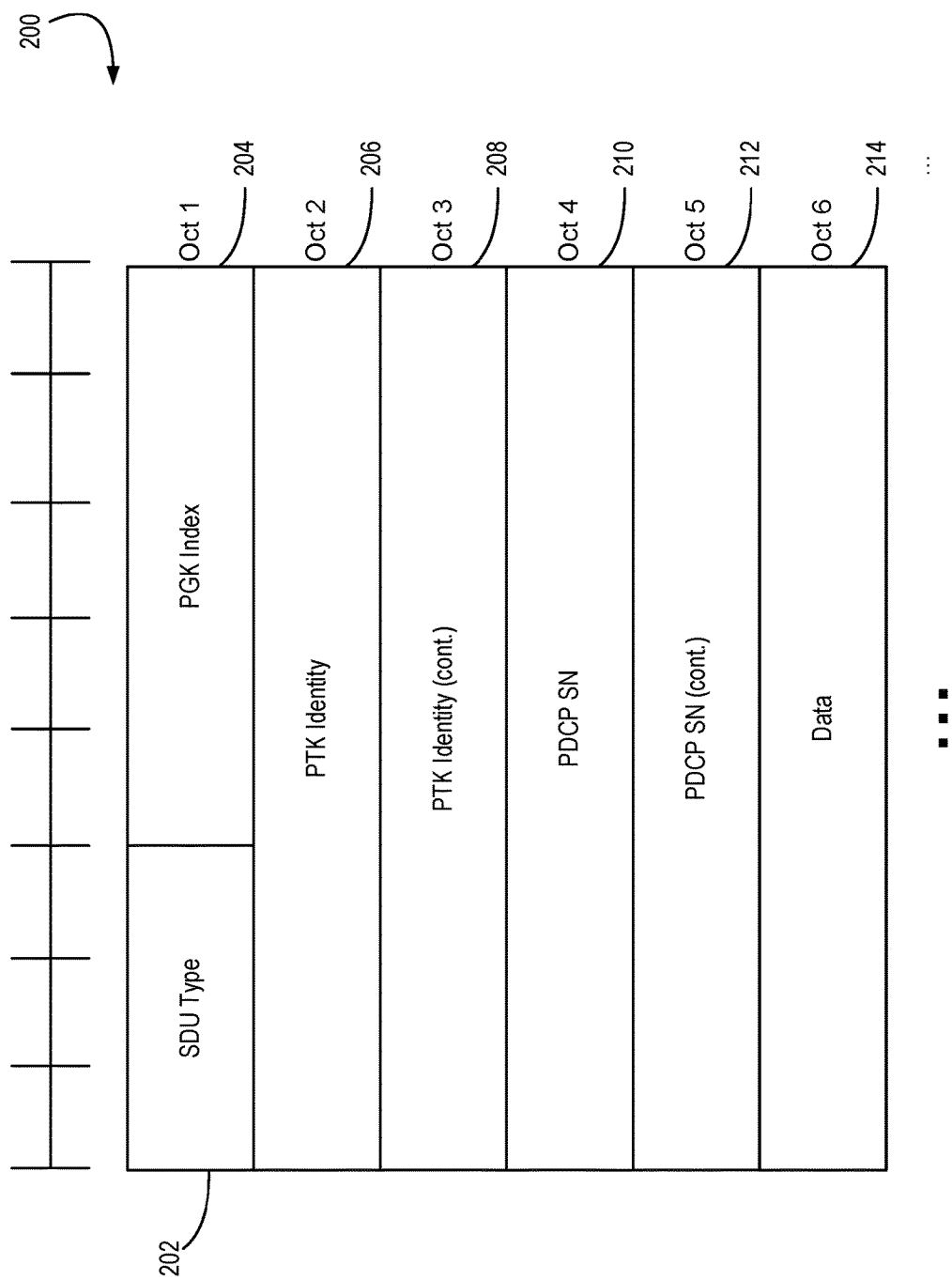
FIG. 2 is a schematic diagram illustrating a packet data convergence protocol (PDCP) data unit consistent with embodiments disclosed herein.

An embodiment 200 of the PDCP protocol data unit to in Rel-12 ProSe [3GPP R2-145305] is illustrated in FIG. 2. The PDCP protocol data unit can include an SDU type, a ProSe Group Key (PGK) 204, a ProSe Traffic Key (PTK) identity 206, 208 and a PDCP sequence number (PDCP SN) 210, 212. An SDU type 202 is the type of the layer-3 protocol data unit. The PDCP entity processes the SDU differently depending on the SDU type 202. For example, header compression is applicable to IP SDU but not address resolution protocol (ARP) SDU. The table below shows supported SDU types, which are IP and ARP. Other values are reserved. [R2-145305]

TABLE 1

| PDCP SDU Type | |
|---|---|
| Bit | Description |
| 000 | IP |
| 001 | ARP |
| 010-111 | Reserved |

There are use cases where the use of IP-based communication may not be practical. For example, in the case of vehicle to vehicle (V2V) or vehicle to infrastructure (V2I) communication the data exchange (e.g., various safety alerts) is often limited between a pair of On-Board Units (OBUs) mounted on a vehicle, or between an OBU and an RSU. These units are manufactured by specialized vendors (e.g., car makers or manufacturers of road-side equipment), and there is no apparent need to open the system to a wider community of application developers. For such cases the use of IP can add unnecessary overhead (such as 128 bits in the IPv6 case).

Figure 3:
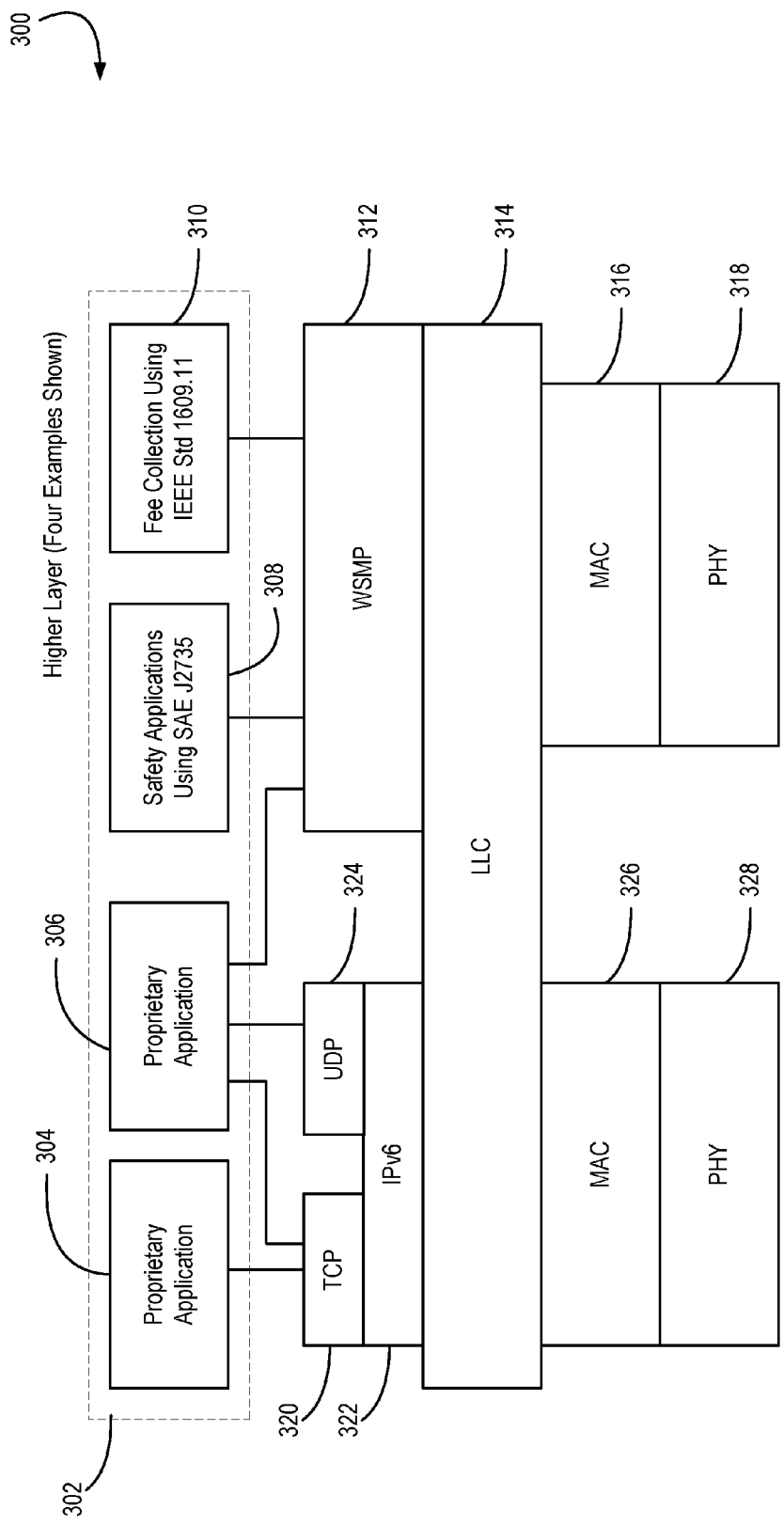
FIG. 3 is a block diagram of a wireless access in vehicular environments (WAVE) protocol stack consistent with embodiments disclosed herein.

The IEEE 1609 standards suite for Wireless Access in Vehicular Environments (WAVE) allows for non-IP in addition to IP-based communication, as illustrated in the protocol stack 300 shown in FIG. 3. A higher layer 302 can include proprietary applications 304 and 306, safety applications 308 and a fee collection 310 (among others). Applications can use TCP 320 or UDP 324 over IPv6 322 or a WAVE Short Message Protocol (WSMP) protocol 312. The protocols 312 can be encapsulated by an LLC layer 314 and supported by a media access control (MAC) layer 326 and 316 and a physical layer 328 and 318.

Figure 4:
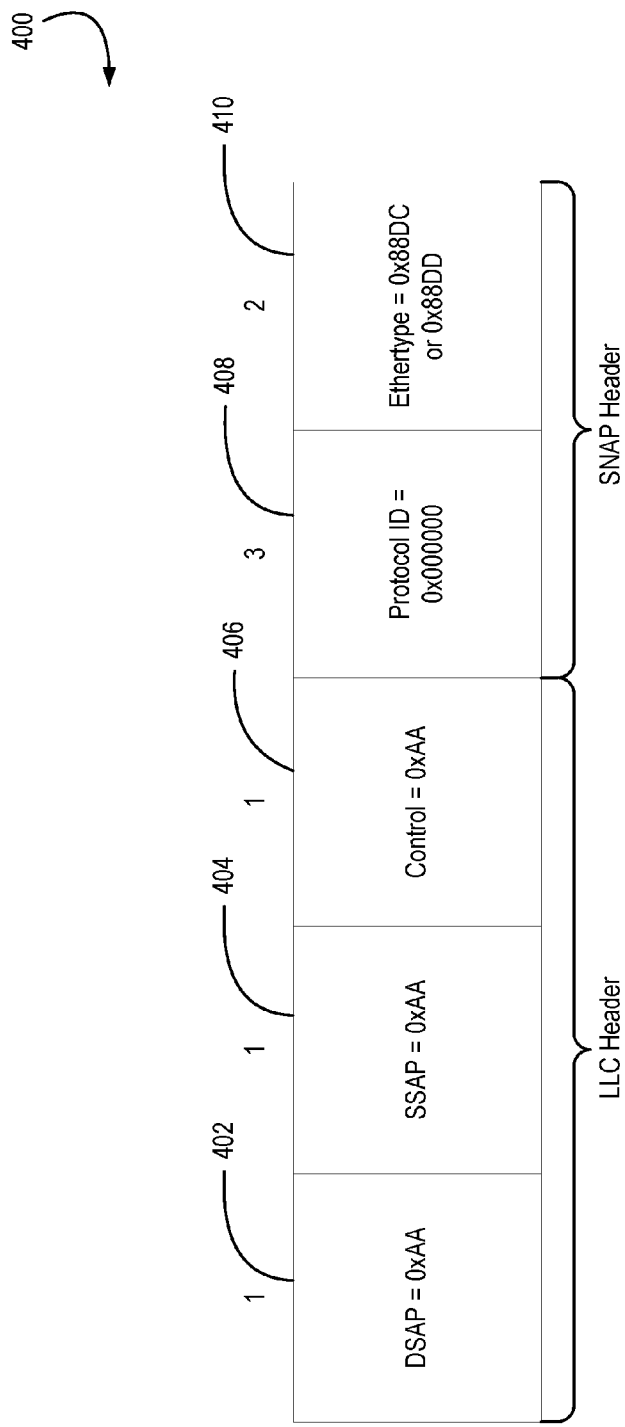
FIG. 4 is a diagram of a logical link control/sub-network access protocol (LLC/SNAP) header for WAVE consistent with embodiments disclosed herein.

The non-IP-based communication is performed with a dedicated message protocol called WAVE Short Message Protocol (WSMP) as shown in FIG. 4. An LLC header 400 includes a destination service access point (DSAP) field 402, a source service access point (SSAP) field 404 and a control field 406. A SNAP header includes a protocol id field 408 and an ethertype field 410. The LLC/SNAP encapsulation used at the LLC sublayer indicates whether the upper protocol data unit is an IP packet or a WSMP message: the ethertype field 410 is set to 0x88DD for IPv6 or 0x88DC for WSMP. In some embodiments, WSMP can be used in a D2D protocol stack, which may use LLC/SNAP encapsulation.

WSMP can be supported using LTE D2D communication by adding an entry to the PDCP SDU type. In a first embodiment a dedicated WSMP, PC5 or other protocol value can be added in the SDU type 202 field as indicated in Table 2. Given the limited size of the SDU type 202 field, a dedicated value for a specific non-IP communication protocol may not be desirable. In a second embodiment, support LLC/SNAP encapsulation in the SDU type 202 can be added to the SDU type 202 field as indicated in Table 3. In a third embodiment, an encapsulation header starting at octet six can be a new encapsulation header (other than LLC/SNAP).

TABLE 2

Dedicated WSMP Value in the SDU Type

| Bit | Description |
| --- | --- |
| 000 | IP |
| 001 | ARP |
| 010 | WSMP |
| 011 | PC5 |
| 100-111 | Reserved |

TABLE 3

Support LLC/SNAP Encapsulation in the SDU Type

| Bit | Description |
| --- | --- |
| 000 | IP |
| 001 | ARP |
| 010 | LLC/SNAP |
| 011-111 | Reserved |

TABLE 4

Generic Encapsulation Support

| Bit | Description |
| --- | --- |
| 000 | IP |
| 001 | ARP |
| 010 | Encapsulated data unit |
| 011-111 | Reserved |

Use of WSMP, PC5 or other protocol can be encapsulated in an LLC/SNAP header. When the SDU type 202 is set to LLC/SNAP, the data unit (starting at octet six in FIG. 1) is LLC/SNAP encapsulated. The use of WSMP (PC5 or another protocol) is then indicated as part of the LLC/SNAP encapsulation header (see FIG. 3). The advantage of this proposal is that it can be used to support other non-IP-based protocols. However, in this embodiment, LLC/SNAP encapsulation wastes six out of eight octets (e.g., with reference to FIG. 3, only the two-octet ethertype is effectively used to discriminate upper layer data units).

Figure 5:
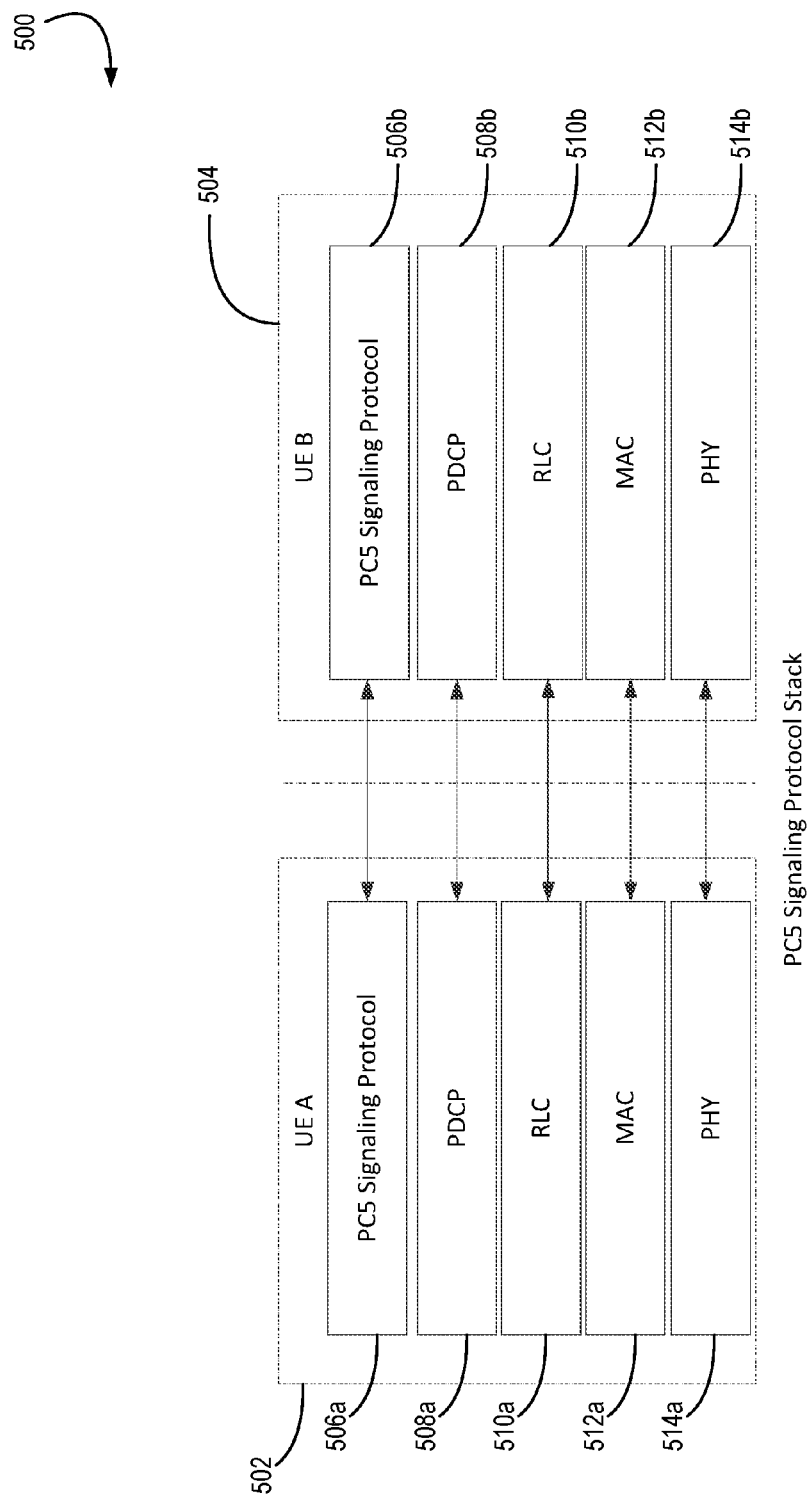
FIG. 5 is a diagram of a PC5 interface and protocol stack consistent with embodiments disclosed herein.

FIG. 5 shows an embodiment 500 with two devices 502 and 504 communicating directly with each other, without packets having to travel through the 3GPP core network. In the figure, a PC5 protocol stack usable with D2D is shown. The protocol stack can include a PC5 Signaling Protocol layer 506a and 506b, a PDCP layer 508a and 508b, a radio link control (RLC) layer 510a and 510b, a medium access (MAC) layer 512a and 512b and a physical (PHY) layer 514a and 514b. An IP address is not needed as the devices can be identified via the ProSe layer-2 ID (e.g., a PC5 MAC-layer identifier 512a and 512b). The usage of IP addresses is redundant in this case.

For example, in 3GPP TR 23.713, ProSe direct communication one to one can be realized by establishing a secure layer-2 link over PC5 between two UEs. A UE has a layer-2 ID for unicast communication that is included in the source layer-2 ID field of a frame that it sends on the layer-2 link and in a destination layer-2 ID of a frame that it receives on the layer-2 link.

A layer-2 ID for unicast communication can be globally unique or the UE can ensure that the layer-2 ID is at least locally unique. If a conflict exits, the UE can detect whether layer-2 ID conflicts with adjacent UEs and self-assign a new ProSe UE ID when a conflict is detected.

A layer-2 link for ProSe direct communication one to one can be identified by the combination of the layer-2 IDs of two UEs. A UE can engage in multiple layer-2 links for ProSe direct communication one to one using the same layer-2 ID.

A PC5 Signaling Protocol is proposed in 3GPP TR 23.713. A PC5 Signaling Protocol establishes a secure layer-2 link over PC5. An SDU type=PC5 Signaling Protocol can be added to an SDU type field in PDCP.

Figure 6:
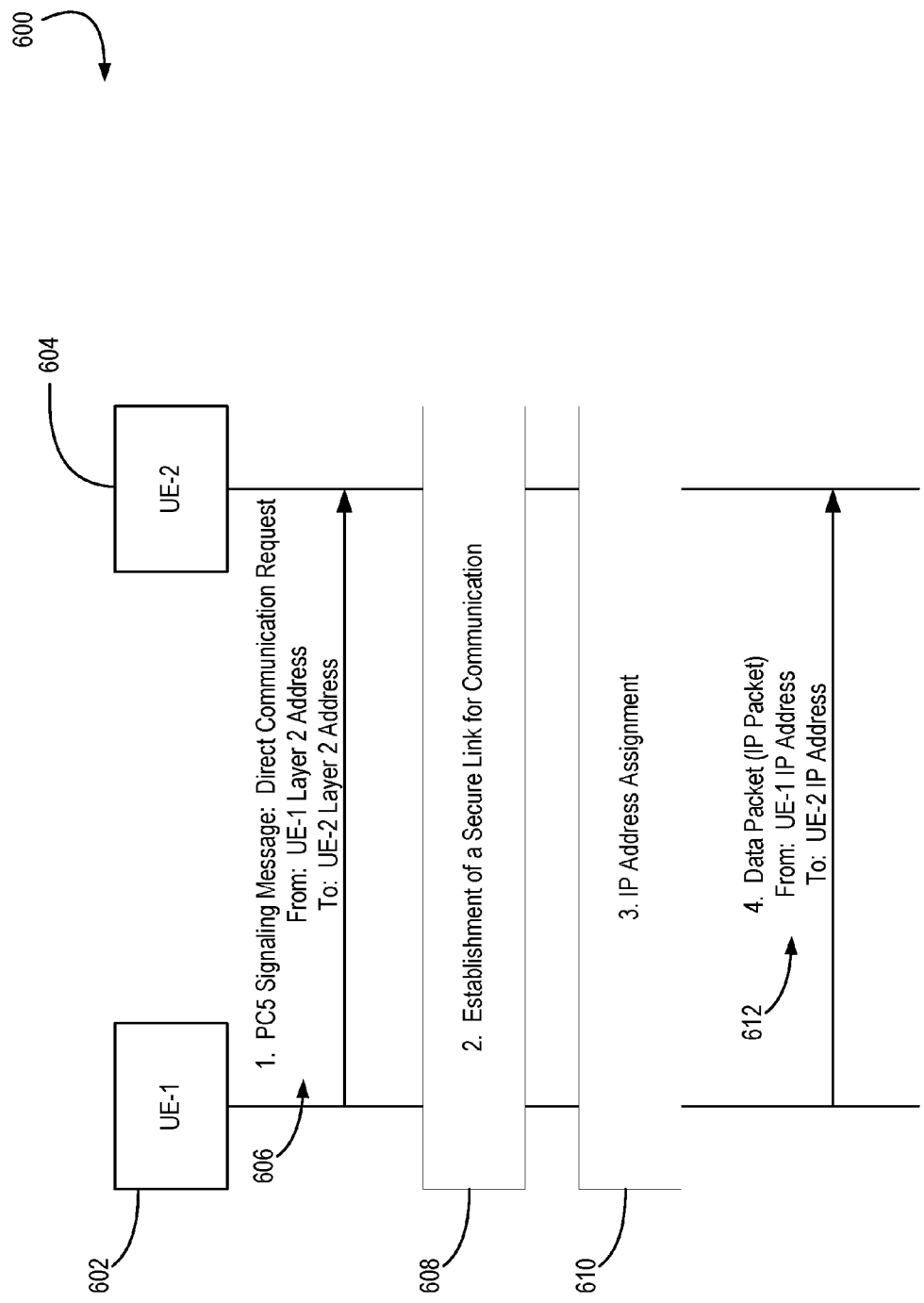
FIG. 6 is a process diagram illustrating PC5 communication using an IP protocol consistent with embodiments disclosed herein.

PC5 Signaling Protocol messages may be sent on a unicast, groupcast or broadcast destination layer-2 ID. In FIG. 6, a procedure 600 for IP-based communication is shown. An initiating UE (UE-1) 602 learns the layer-2 ID of a peer UE (UE-2) 604 (e.g., by listening to announcements broadcasted by the other UE or by performing a ProSe discovery procedure) and sends a Direct Communication Request message 606 to the UE-2 604 in order to trigger mutual authentication. The UE-2 604 initiates a procedure for mutual authentication 608. The successful completion of the procedure for mutual authentication 608 completes the establishment of the secure layer-2 link over PC5. One of the two UEs acts as DHCP server or IPv6 default router, or UEs self-assign 610 a link-local IP address. Data is transmitted 612 using IP addresses over the user plane using SDU type=IP.

In contrast to FIG. 6, FIGS. 7-9 show procedures for non-IP-based communication. In both procedures the user data is carried inside a PC5 Signaling Protocol message. A negotiated procedure or non-negotiated procedure can be used. In a negotiated procedure, two UEs first establish a secure layer-2 link. The key material exchanged during layer-2 link establishment is used for confidentiality and/or integrity protection of subsequent user data. In a non-negotiated procedure, two UEs exchange data without prior layer-2 link establishment. A sender asserts an identity and digitally signs it in every message (e.g., with an ECCSI signature). Optionally, parts of the message may also be encrypted and the one-shot key used for encryption is conveyed within the message itself (e.g., as SAKKE payload).

Figure 7:
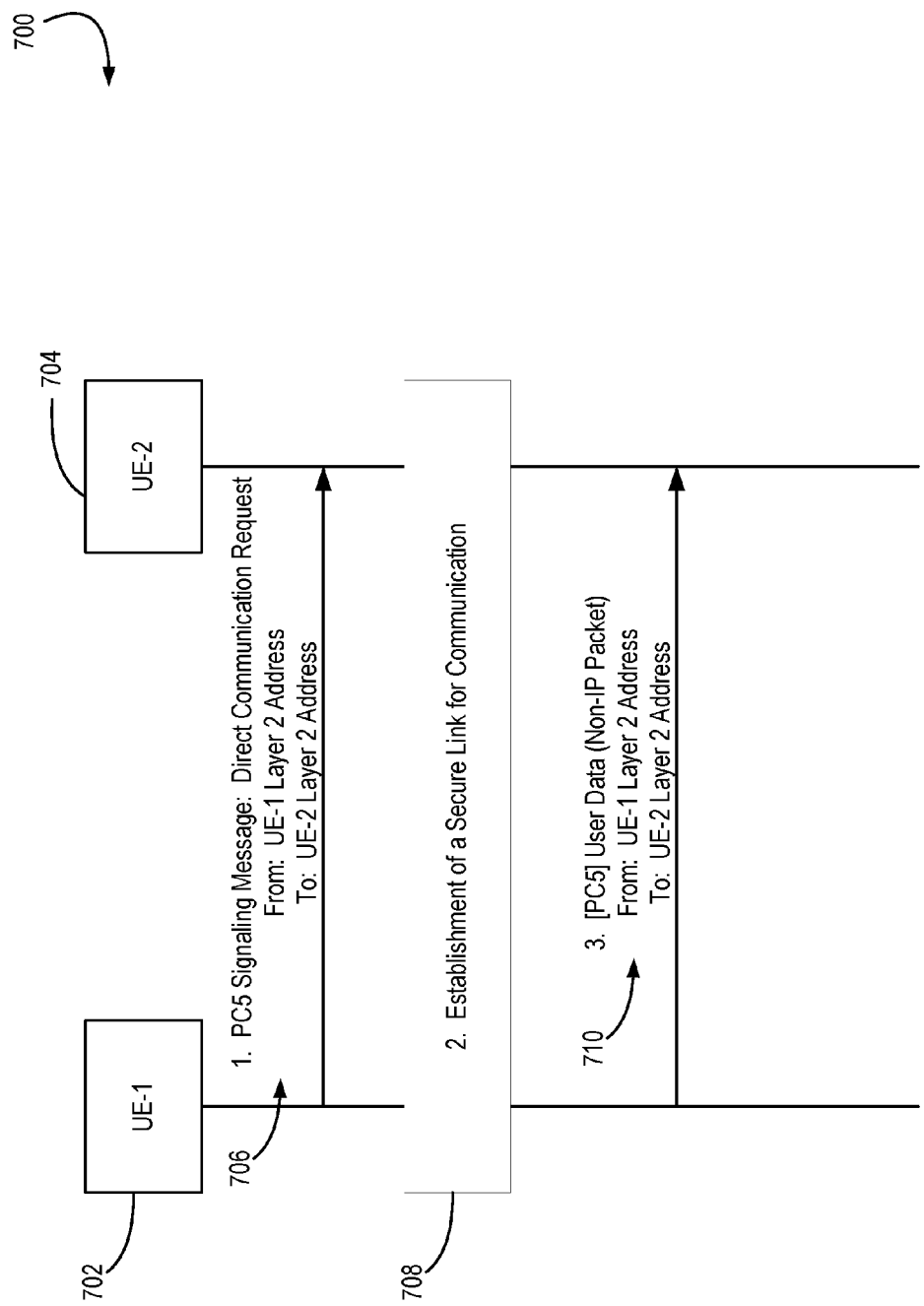
FIG. 7 is a process diagram illustrating PC5 communication with security negotiation consistent with embodiments disclosed herein.

FIG. 7 shows a negotiated procedure 700. An initiating UE (UE-1) 702 learns the layer-2 ID of a peer UE (UE-2) 704 (e.g., by listening to announcement broadcasted by the other UE or by performing a ProSe discovery procedure) and sends a Direct Communication Request message 706 to the UE-2 704 in order to trigger mutual authentication. The UE-2 704 initiates the procedure for mutual authentication. The successful completion of the authentication procedure completes the establishment of a secure layer-2 link 708 over PC5. Data is transmitted by piggybacking user data inside a PC5 Signaling Protocol message 710 (e.g., using a PC5 User Data message). In some embodiments, an SDU type can be set to a PC5 Signaling Protocol. The user data can be carried as part of the payload of the PC5 Signaling Protocol message 710 referred to as PC5 user data.

Figure 8:
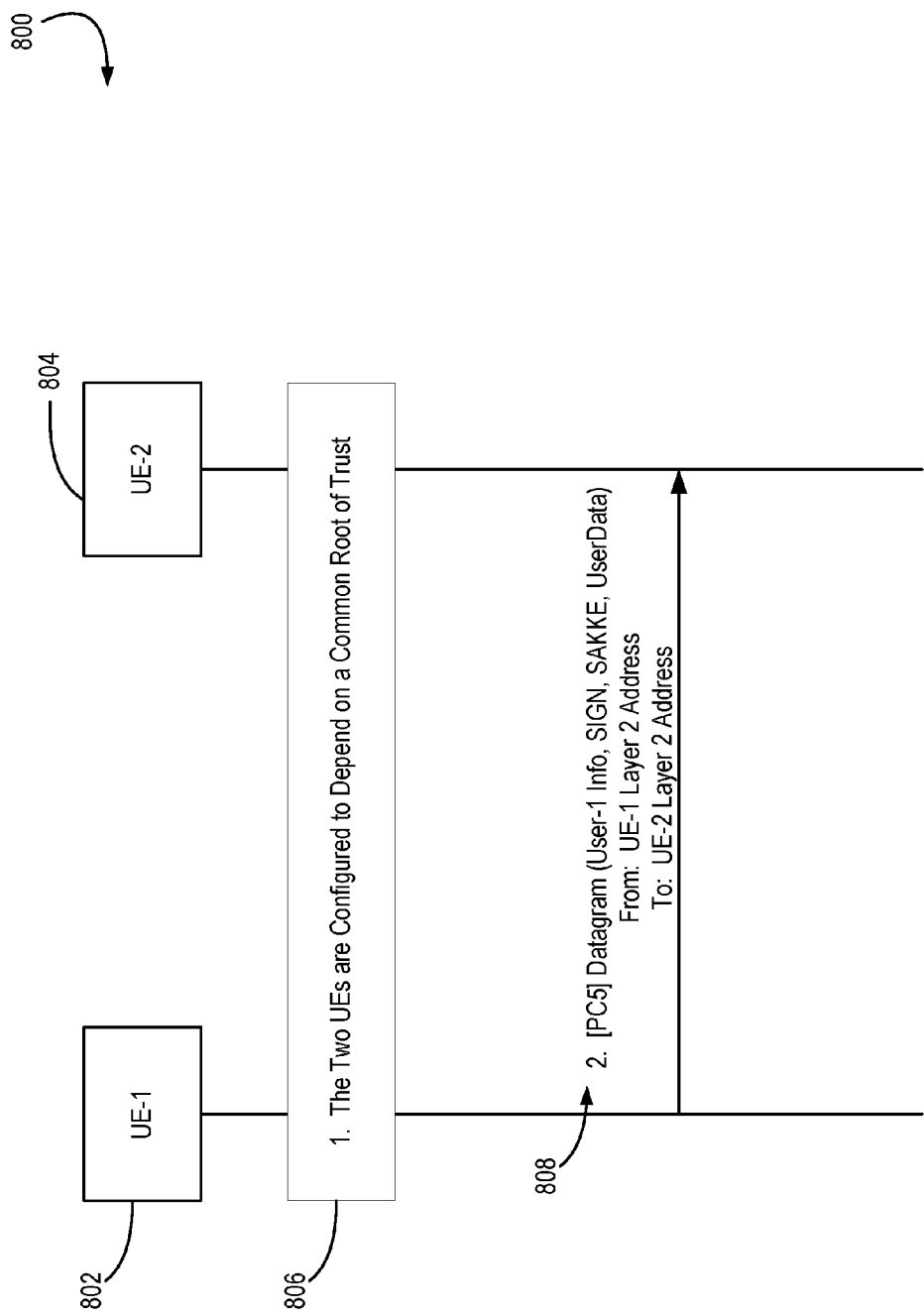
FIG. 8 is a process diagram illustrating PC5 communication without security negotiation using a common key management server consistent with embodiments disclosed herein.

In FIG. 8, an example of a non-negotiated procedure 800 is shown. UEs 802 and 804 are configured for use of identity-based cryptography and depend on a common root of trust 806, referred to as the Key Management System. The UEs 802 and 804 are configured for use of an ECCSI signature scheme (IETF RFC 6507 and described in connection with FIG. 10) and SAKKE algorithm (IETF RFC 6508 and described in connection with FIG. 11) as mechanisms for digital signature of an asserted identity and secure exchange of a secret key. In addition to a public user identity (referred to here as User-1 Info or User-2 Info, both encoded in a user@realm format with an appended timestamp or any other format that is compatible with the guidelines in IETF RFC 6509), the UEs 802 and 804 are configured with the following information:

KPAK—KMS Public Authentication Key (IETF RFC 6507)
    SSK—Secret Signing Key (IETF RFC 6507)
    PVT—Public Validation Token (IETF RFC 6507)
    KMS Public Key (IETF RFC 6508)
    RSK—Receiver Secret Key (IETF RFC 6508)

An initiating UE (UE-1) 802 learns a layer-2 ID of a peer UE (UE-2) 804 and the public identity of the UE-2 804's user (User-2 Info). For example, the UE-1 802 can listen to announcements broadcasted by the UE-2 804 or by performing a ProSe discovery procedure.

The UE-1 802 sends a PC5 Datagram 808 including parameters such as User-1. Info, SIGN, SAKKE, or User Data message to the UE-2 804. User-1. Info parameter is a public identity that is asserted by the user of the UE-1 802. SIGN parameter is an ECCSI signature of the PC5 Datagram 808 message. The signature may be computed over all or a subset of the parameters in the message. In one embodiment, the signature is computed over the User-1. Info parameter. A process for computing the ECCSI signature is described in IETF RFC 6507, which makes use of the KPAK, SSK and SVT parameters.

In some embodiments, a SAKKE payload is optional. It can be used if the user data parameter carried in the same message is to be encrypted. For example, the UE-1 802 generates an encryption key (aka Shared Secret Value (SSV)) in IETF RFC 6508) and encodes it into a SAKKE payload according to the algorithm described in IETF RFC 6508, using the KMS Pubic Key and the public identity of the UE-2 804's user (User-2 Info). A user data parameter designates the user data. It is encrypted with the encryption key provided inside the SAKKE payload.

Figure 9:
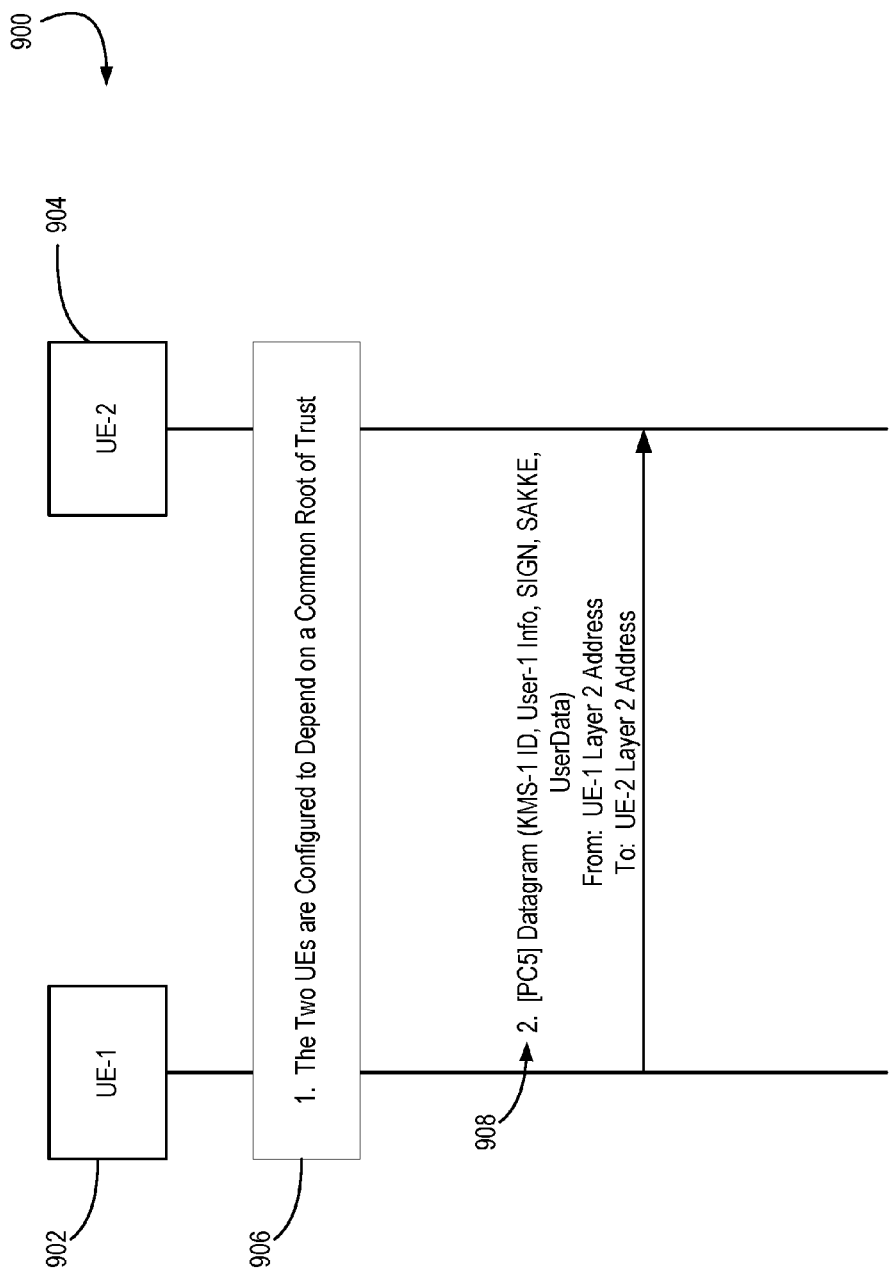
FIG. 9 is a process diagram illustrating PC5 communication without security negotiation using different key management servers consistent with embodiments disclosed herein.

FIG. 9 shows a procedure 900 for non-negotiated non-IP data over PC5 with UEs depending on different Key Management Servers (KMSs). In some deployments UE 902 and 904 population may be split among several KMSs. This can be because the KMSs are operated by different administrations, or because the UE population is so big that it may not be practical to handle with a single KMS.

In these multiple KMS deployment scenarios, a UE belongs to a specific KMS that is identified via a unique KMS Identifier (KMS ID). The KMS ID can be encoded as a URI (e.g., in the server@realm format) which is a text string. However, if the set of KMSs handling the overall UE population depend on a single "super-administrator," it may be possible to use much shorter KMS IDs (e.g., on the order of one or two octets).

In the embodiment shown, an initiating UE (UE-1) 902 and a peer UE (UE-2) 904 are configured for use of identity-based cryptography and depend on different KMSs. In one embodiment, they are configured for use of the ECCSI signature scheme (IETF RFC 6507) and SAKKE algorithm (IETF RFC 6508) as mechanisms for digital signature of an asserted identity and secure exchange of a secret key. In addition to its public user identity (referred to here as User-1 Info or User-2 Info, both encoded in a user@realm format with an appended timestamp, or any other format that is compatible with the guidelines in IETF RFC 6509), each UE in the embodiment is configured with the following information:

For each KMS to which the UE belongs it is configured with the following parameters:
    KMS ID (unique identifier of the KMS; in some embodiments it can be deducible from the User Info)
    KPAK—KMS Public Authentication Key (IETF RFC 6507)
    SSK—Secret Signing Key (IETF RFC 6507)
    PVT—Public Validation Token (IETF RFC 6507)
    KMS Public Key (IETF RFC 6508)
    RSK—Receiver Secret Key (IETF RFC 6508)

For all other KMSs the UE is configured with the following information:
    KMS Public Key (IETF RFC 6508)

The UE-1 902 and the UE-2 904 depend on a common root of trust 906. The UE-1 902 learns the layer-2 ID of the peer UE-2 904 and the public identity of the UE-2 904's user (User-2 Info) and the KMS-2 ID of the KMS to which the UE-2 904's user belongs (note that KMS-2 ID can be deducible from the User-2 Info in some embodiments). This can be done, e.g., by listening to announcements broadcasted by the peer UE or by performing a ProSe discovery procedure. The UE-1 902 sends a PC5 Datagram message 908 with parameters of KMS-1 ID, User-1 Info, SIGN, SAKKE, and user data to the UE-2 904. The KMS-1 ID parameter is the identifier of the KMS to which the UE-1 902's user belongs (note that KMS-1 ID may be deducible from the User-1 Info). The User-1 Info parameter is a public identity that is asserted by the user of the UE-1 902. The SIGN parameter is an ECCSI signature of the PC5 Datagram message 908. The signature may be computed over all or a subset of the parameters in the message. In one embodiment, the signature is computed over the User-1 Info parameter. A process for computing the ECCSI signature is described in IETF RFC 6507; it makes use of the KPAK, SSK and SVT parameters corresponding to the KMS to which the UE-1 902 belongs.

In one embodiment, a SAKKE payload can be optional. It is used if the user data parameter carried in the same message needs to be encrypted. In an embodiment, the UE-1 902 generates an encryption key (aka Shared Secret Value (SSV) in RFC 6508) and encodes it into a SAKKE payload according to the algorithm described in IETF RFC 6508, using the KMS Pubic Key of KMS-2 (i.e., the KMS to which the user of the UE-2 904 belongs) and the public identity of the UE-2 904's user (User-2 Info). A user data parameter designates the user data. It can be encrypted with the encryption key provided inside the SAKKE payload.

The non-negotiated procedures described in FIG. 8 and FIG. 9 can also be used in case the user data is encapsulated in a generic encapsulation header (i.e., it does not have to be carried as part of the PC5 Signaling Protocol payload). In this case the presence of the encapsulation header is signaled by an appropriate value of the SDU type field in the PDCP header.

The non-negotiated procedures described in FIG. 8 and FIG. 9 can also be used in case where the user data is an IP packet. In this case, again, the presence of the encapsulation header is signaled by an appropriate value of the SDU type field in the PDCP header. The SDU type value also implies that the encapsulated data is an IP packet.

Figure 10:
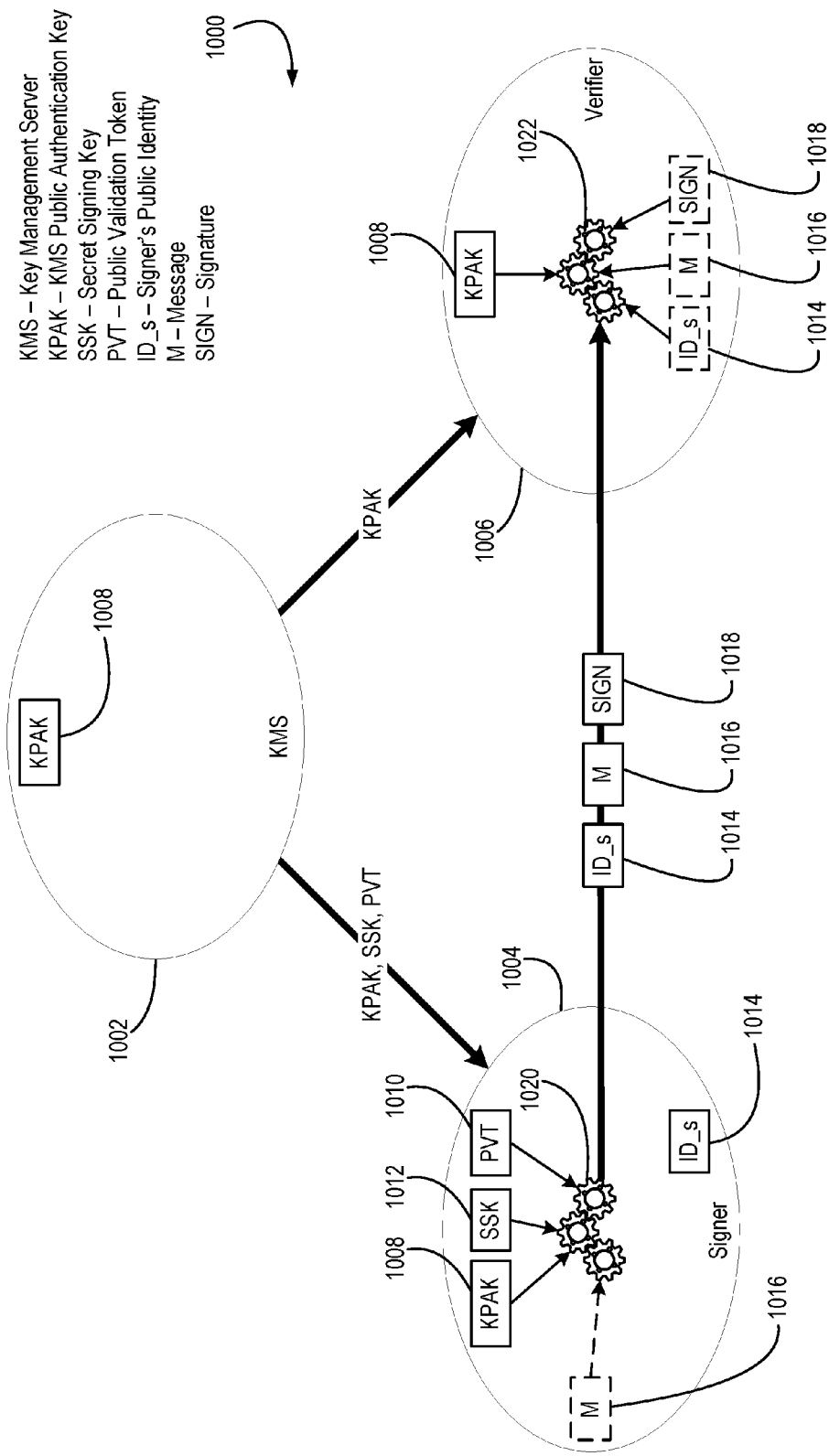
FIG. 10 is a process diagram illustrating an Elliptic Curve-based Certificateless Signatures for Identity-based Encryption (ECCSI) signature scheme consistent with embodiments disclosed herein.

FIG. 10 shows an embodiment of an ECCSI signature scheme 1000 in IETF RFC 6507 which allows a message (M) 1016 to be signed by a Signer 1004 and then verified by a Verifier 1006 using identity-based cryptography. The Signer 1004 and the Verifier 1006 have a common root of trust referred to as a Key Management Server which includes a KMS 1002. The KMS 1002 owns a KMS Public Authentication Key (KPAK) 1008 that is known by users of the KMS 1002. In addition, every user has a publicly known identity (e.g., an ID_s 1014 is the public identity of the Signer 1004 (ID_r, not shown, is the public identity of the receiver).

A user wishing to digitally sign 1020 its messages can request the KMS 1002 for a pair of Secret Signing Key (SSK) 1012 and a Public Validation Token (PVT) 1010. The Signer 1004 uses the KPAK 1008, the SSK 1012 and the PVT 1010 parameters to produce a digital signature (SIGN) 1018 according to the process described in IETF RFC 6507. In some embodiments, the PVT 1010 parameter is not secret and is included inside the SIGN 1018 payload as clear text. Upon reception of a digitally signed message the Verifier 1006 uses the KPAK 1008 and the Signer 1004's public identity (the ID_s 1014) to perform a verification process 1022 as described in IETF RFC 6507.

Figure 11:
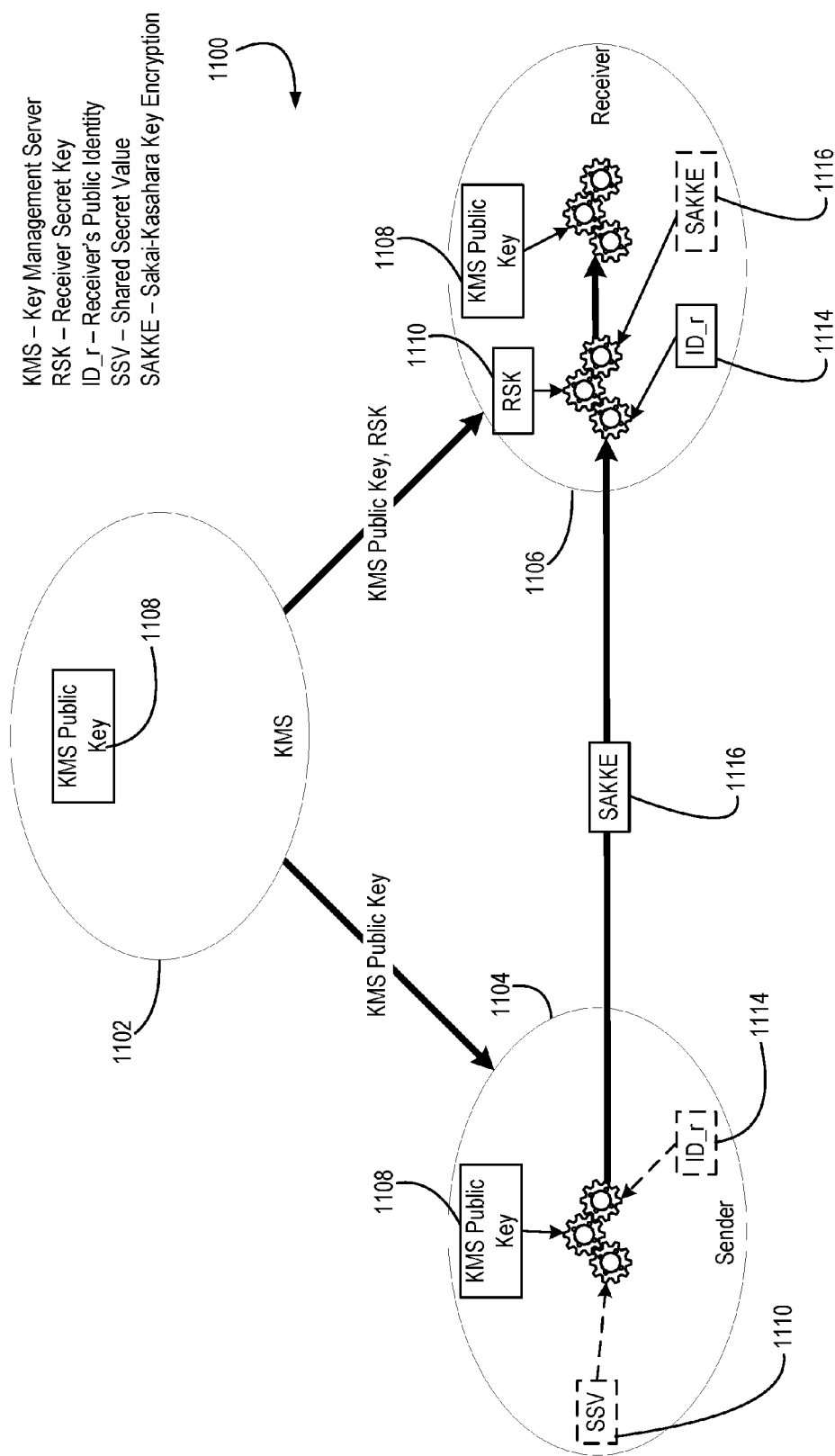
FIG. 11 is a process diagram illustrating Sakai-Kasahara Key Encryption (SAKKE) secret key exchange consistent with embodiments disclosed herein.

FIG. 11 shows an embodiment of a SAKKE algorithm 1100 defined in IETF RFC 6508 which allows for encrypted exchange of a shared secret key between a Sender 1104 and a Receiver 1106 using identity-based cryptography. The Sender 1104 and the Receiver 1106 have again a common root of trust (e.g., a KMS 1102). The KMS 1102 owns a KMS Public Key 1108 that is known by the users. Each user has a publicly known identity (e.g., an ID_r 1114 is the public identity of the Receiver 1106; ID_s, not shown, is the public identity of the Sender 1104). To enable a user to decrypt messages, the user provides the KMS 1102 a request for a Receiver Secret Key (RSK) 1110. The Sender 1104 uses the KMS Pubic Key 1108 and the Receiver 1106's public identity (the ID_r 1114) to encode a Shared Secret Value (SSV) 1110 according to the process described in IETF RFC 6508. A resulting encrypted payload is referred to as a SAKKE payload 1116. Upon reception of the SAKKE payload 1116 the Receiver 1106 uses the KMS Public Key 1108, the RSK 1110 and the Receiver 1106's public identity (the ID_r 1114) to perform the decryption algorithm as described in IETF RFC 6508.

Figure 12:
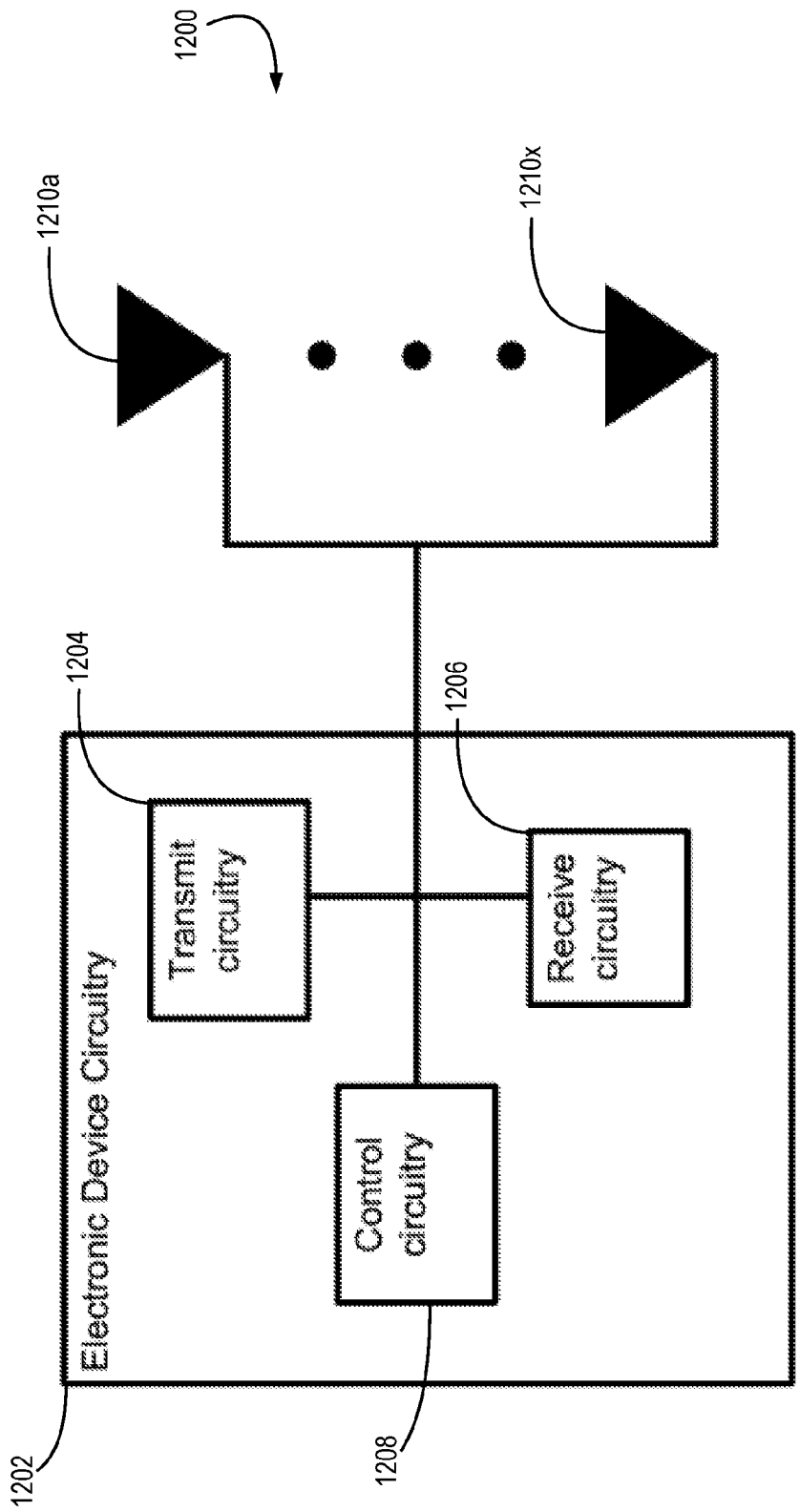
FIG. 12 is a process diagram illustrating electronic device circuitry consistent with embodiments disclosed herein.

FIG. 12 illustrates an electronic device circuitry 1202 that may be eNB circuitry, UE circuitry, or some other type of circuitry that forms a system 1200 in accordance with various embodiments. In embodiments, the electronic device circuitry 1202 may be, or may be incorporated into or otherwise a part of, an eNB, a UE, or some other type of electronic device. In embodiments, the electronic device circuitry 1202 may include a radio transmit circuitry 1204 and a receive circuitry 1206 coupled to a control circuitry 1208. In embodiments, the transmit circuitry 1204 and/or the receive circuitry 1206 may be elements or modules of transceiver circuitry, as shown. The electronic device circuitry 1202 may be coupled with one or more plurality of antenna elements 1210a to 1210x of one or more antennas. The electronic device circuitry 1202 and/or the components of the electronic device circuitry 1202 may be configured to perform operations similar to those described elsewhere in this disclosure.

In embodiments wherein the electronic device circuitry 1202 is a UE or is part of or otherwise incorporated into a UE, the transmit circuitry 1204 may be able to transmit, to a second user equipment (UE) based on a layer-2 identity of the second UE, a request for establishment of a secure link for communication over PC5. The receive circuitry 1206 may be able to receive, from the second UE, an indication of completion of establishment of the secure link by the second UE. The control circuitry 1208 may be able to encapsulate a data packet inside a PC5 Signaling Protocol message.

Additionally or alternatively, the transmit circuitry 1204 may be able to transmit, by the second UE to a first UE based on a layer-2 identity of the second UE, an indication of completion of establishment of a secure link by the second UE for direct data communication with the first UE over PC5 based on a request from the first UE. The receive circuitry 1206 may be able to receive, from the first UE based on a transmission of the indication of completion, a data packet inside a PC5 Signaling Protocol message in the secure link over PC5.

Additionally or alternatively, the control circuitry 1208 may be able to generate a data transmission that includes a data as encapsulated data and an encapsulation header that includes an asserted public identity of a user of the first UE, a digital signature related to the first UE, an encryption key used to encrypt the data if the data is encrypted and/or a key management server. The transmit circuitry 1204 may be able to transmit the data transmission to the second UE.

Additionally or alternatively, the receive circuitry 1206 may be able to receive a data transmission that includes encapsulated data and an encapsulation header. The control circuitry 1208 may be able to identify data in the encapsulated data based on an asserted public identity of a user of the first UE, a digital signature related to the first UE, an encryption key used to encrypt the data if the data is encrypted and/or a key management server in the encapsulation header.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

Method 1

Figure 13:
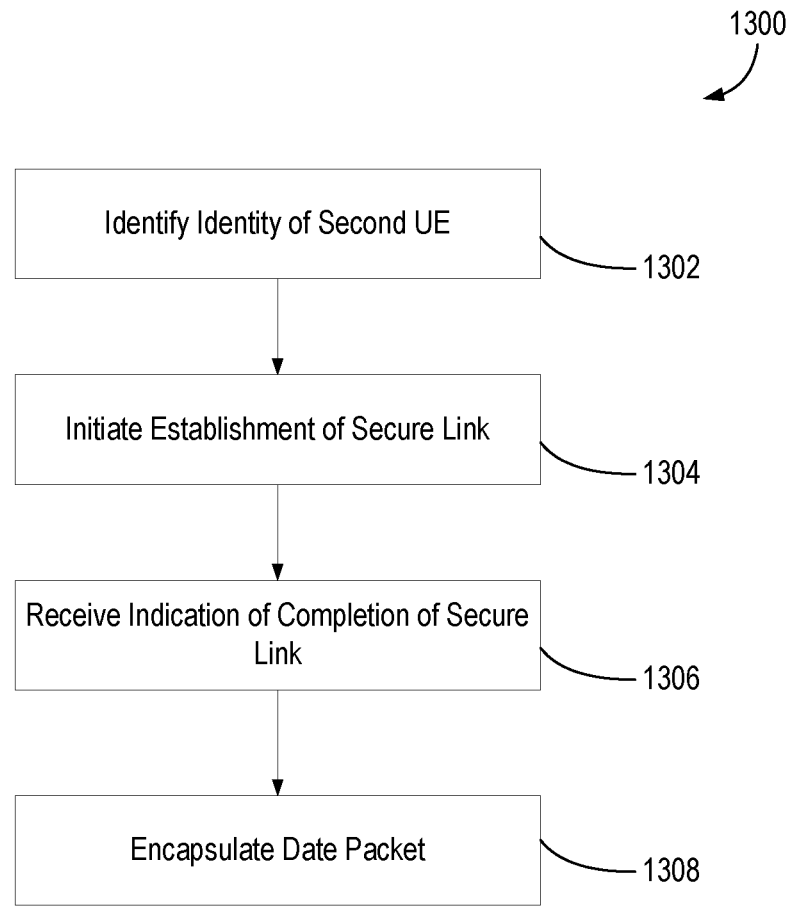
FIG. 13 is a flowchart illustrating a method of communication with security negotiation consistent with embodiments disclosed herein.

In some embodiments, the electronic device circuitry 1202 of FIG. 12 may be configured to perform one or more processes such as a process 1300 of FIG. 13. For example, in embodiments where the electronic device circuitry 1202 is a UE, or is incorporated into or otherwise part of a UE, the process 1300 may include a method of direct data communication between a first user equipment (UE) and a second UE. The process 1300 may include identifying 1302, by the first UE, a layer-2 identity of the second UE. The process 1300 may further include initiating 1304, by the first UE, the establishment of a secure link for communication with the second UE over PC5. The process 1300 may further include receiving 1306, by the first UE, an indication of completion of establishment of the secure link by the second UE. The process 1300 may further include encapsulating 1308, by the first UE, a data packet inside a PC5 Signaling Protocol message.

Figure 14:
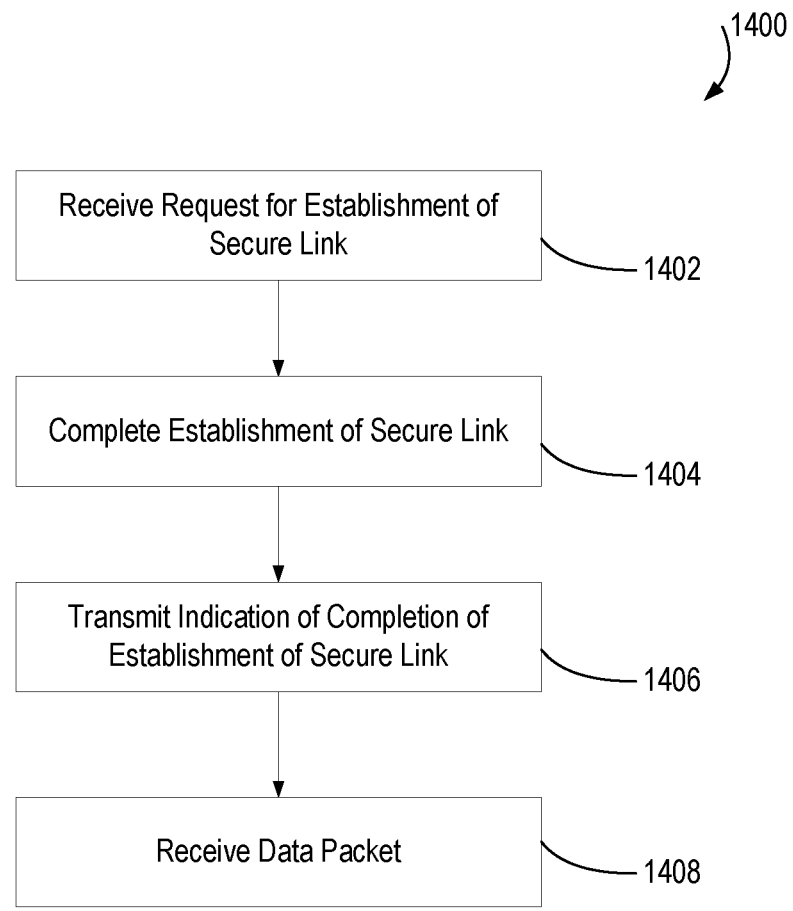
FIG. 14 is a flowchart illustrating a method of receiving data with security negotiation consistent with embodiments disclosed herein.

Additionally or alternatively, the electronic device circuitry 1202 of FIG. 12 may be configured to perform one or more processes such as a process 1400 of FIG. 14. For example, in embodiments where the electronic device circuitry 1202 is a UE, or is incorporated into or otherwise part of a UE, the process 1400 may include a method of direct data communication between a first user equipment (UE) and a second UE. The process 1400 may include receiving 1402, by the second UE from the first UE based on a layer-2 identity of the second UE, a request for establishment of a secure link for communication with the second UE over PC5. The process 1400 may further include completing 1404, by the second UE based on the request, establishment of the secure link. The process 1400 may further include transmitting 1406, by the second UE, an indication of completion of establishment of the secure link by the second UE. The process 1400 may further include receiving 1408, by the second UE from the first UE based on the completion of establishment of the secure link, a data packet inside a PC5 Signaling Protocol message in the secure link over PC5.

Figure 15:
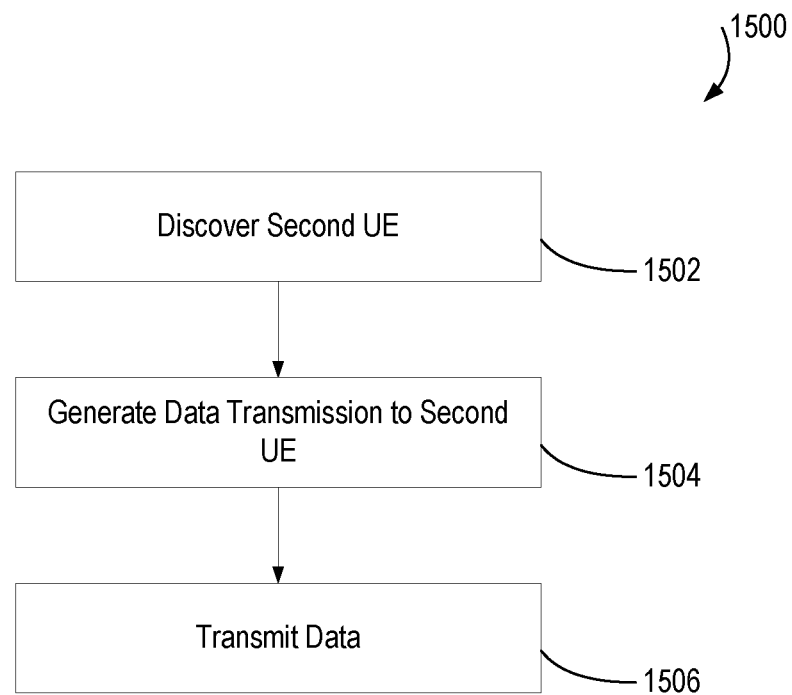
FIG. 15 is a flowchart illustrating a method of communication without security negotiation consistent with embodiments disclosed herein.

Additionally or alternatively, the electronic device circuitry 1202 of FIG. 12 may be configured to perform one or more processes such as a process 1500 of FIG. 15. For example, in embodiments where the electronic device circuitry 1202 is a UE, or is incorporated into or otherwise part of a UE, the process 1500 may include a method of direct data communication between a first user equipment (UE) and a second UE without prior establishment of a layer-2 secure link between the first UE and the second UE and based on the use of identity-based cryptography. The process 1500 can include discovering 1502 a second UE. The process 1500 may include generating 1504, by the first UE, a data transmission that includes a data as encapsulated data and an encapsulation header that includes an asserted public identity of a user of the first UE, a digital signature related to the first UE, an encryption key used to encrypt the data if the data is encrypted and/or a key management server. The process 1500 may further include transmitting 1506, by the first UE, the data transmission to the second UE.

Figure 16:
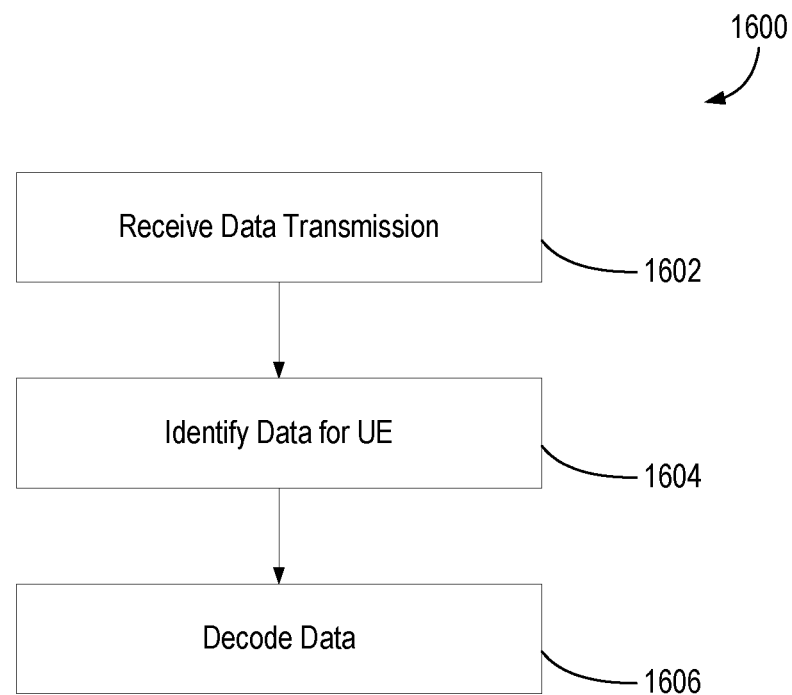
FIG. 16 is a flowchart illustrating a method of receiving communication without security negotiation consistent with embodiments disclosed herein.

Additionally or alternatively, the electronic device circuitry 1202 of FIG. 12 may be configured to perform one or more processes such as a process 1600 of FIG. 16. For example, in embodiments where the electronic device circuitry 1202 is a UE, or is incorporated into or otherwise part of a UE, the process 1600 may include a method of direct data communication between a first user equipment (UE) and a second UE without prior establishment of a layer-2 secure link between the first UE and the second UE and based on the use of identity-based cryptography. The process 1600 may include receiving 1602, by the second UE, a data transmission that includes encapsulated data and an encapsulation header. The process 1600 may further include identifying 1604, by the second UE, data in the encapsulated data based on an asserted public identity of a user of the first UE, a digital signature related to the first UE, an encryption key used to encrypt the data if the data is encrypted and/or a key management server in the encapsulation header. The process 1600 may include decoding 1606 the data.

Figure 17:
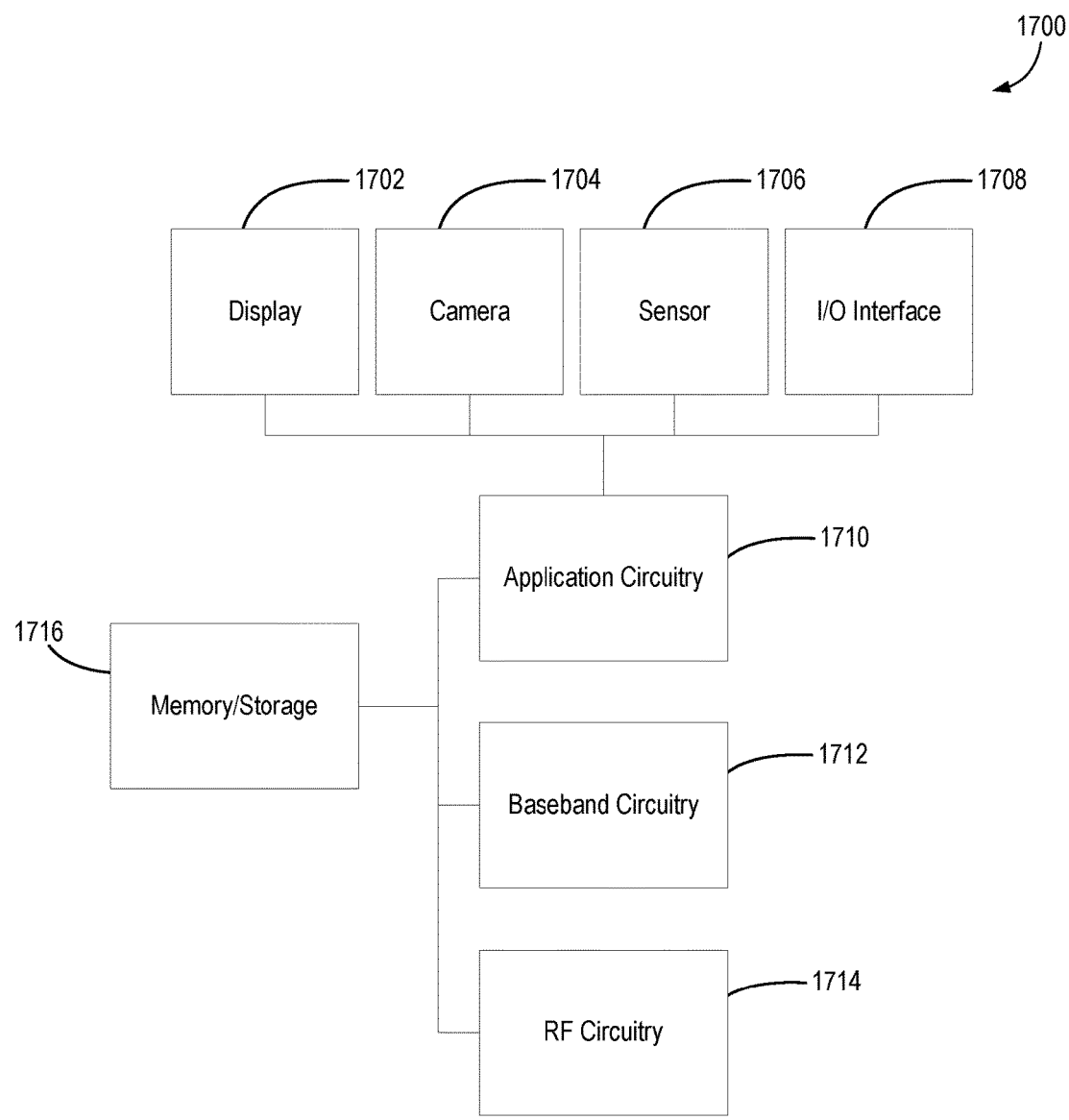
FIG. 17 is a schematic diagram of a computing system consistent with embodiments disclosed herein.

Embodiments described herein may be implemented into a system using any suitably configured hardware and/or software. FIG. 17 illustrates, for one embodiment, an example system 1700 comprising a radio frequency (RF) circuitry 1714, a baseband circuitry 1712, an application circuitry 1710, a memory/storage 1716, a display 1702, a camera 1704, a sensor 1706, and an input/output (I/O) interface 1708, coupled with each other at least as shown.

The application circuitry 1710 may include circuitry such as, but not limited to, one or more single-core or multi-core processors. The processor(s) may include any combination of general-purpose processors and dedicated processors (e.g., graphics processors, application processors, etc.). The processors may be coupled with the memory/storage 1716 and configured to execute instructions stored in the memory/storage 1716 to enable various applications and/or operating systems running on the system 1700.

The baseband circuitry 1712 may include circuitry such as, but not limited to, one or more single-core or multi-core processors. The processor(s) may include a baseband processor. The baseband circuitry 1712 may handle various radio control functions that enable communication with one or more radio networks via the RF circuitry 1714. The radio control functions may include, but are not limited to, signal modulation, encoding, decoding, radio frequency shifting, etc. In some embodiments, the baseband circuitry 1712 may provide for communication compatible with one or more radio technologies. For example, in some embodiments, the baseband circuitry 1712 may support communication with an Evolved Universal Terrestrial Radio Access Network (E-UTRAN) and/or other wireless metropolitan area network (WMAN), a wireless local area network (WLAN), and a wireless personal area network (WPAN). Embodiments in which the baseband circuitry 1712 is configured to support radio communications of more than one wireless protocol may be referred to as multi-mode baseband circuitry.

In various embodiments, the baseband circuitry 1712 may include circuitry to operate with signals that are not strictly considered as being in a baseband frequency. For example, in some embodiments, the baseband circuitry 1712 may include circuitry to operate with signals having an intermediate frequency, which is between a baseband frequency and a radio frequency.

The RF circuitry 1714 may enable communication with wireless networks using modulated electromagnetic radiation through a non-solid medium. In various embodiments, the RF circuitry 1714 may include switches, filters, amplifiers, etc. to facilitate the communication with the wireless network.

In various embodiments, the RF circuitry 1714 may include circuitry to operate with signals that are not strictly considered as being in a radio frequency. For example, in some embodiments, the RF circuitry 1714 may include circuitry to operate with signals having an intermediate frequency, which is between a baseband frequency and a radio frequency.

In various embodiments, transmit circuitry, control circuitry, and/or receive circuitry discussed or described herein may be embodied in whole or in part in one or more of the RF circuitry 1714, the baseband circuitry 1712, and/or the application circuitry 1710. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 1712, the application circuitry 1710, and/or the memory/storage 1716 may be implemented together on a system on a chip (SOC).

The memory/storage 1716 may be used to load and store data and/or instructions. The memory/storage 1716 for one embodiment may include any combination of suitable volatile memory (e.g., dynamic random access memory (DRAM)) and/or non-volatile memory (e.g., Flash memory).

In various embodiments, the I/O interface 1708 may include one or more user interfaces designed to enable user interaction with the system 1700 and/or peripheral component interfaces designed to enable peripheral component interaction with the system 1700. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments the sensor 1706 may include one or more sensing devices to determine environmental conditions and/or location information related to the system 1700. In some embodiments, the sensors 1706 may include, but are not limited to, a gyro sensor, an accelerometer, a proximity sensor, an ambient light sensor, and a positioning unit. The positioning unit may also be part of, or interact with, the baseband circuitry 1712 and/or the RF circuitry 1714 to communicate with components of a positioning network, e.g., a global positioning system (GPS) satellite.

In various embodiments, the display 1702 may include a display (e.g., a liquid crystal display, a touch screen display, etc.).

In various embodiments, the system 1700 may be a mobile computing device such as, but not limited to, a laptop computing device, a tablet computing device, a netbook, an ultrabook, a smartphone, etc. In various embodiments, the system 1700 may have more or less components, and/or different architectures.

In various embodiments, the system 1700 may be a mobile computing device such as, but not limited to, a laptop computing device, a tablet computing device, a netbook, an ultrabook, a smartphone, etc. In various embodiments, the system 1700 may have more or less components, and/or different architectures. For example, in some embodiments the RF circuitry 1714 and/or the baseband circuitry 1712 may be embodied in communication circuitry (not shown). The communication circuitry may include circuitry such as, but not limited to, one or more single-core or multi-core processors and logic circuits to provide signal processing techniques, for example, encoding, modulation, filtering, converting, amplifying, etc., suitable to the appropriate communication interface over which communications will take place. The communication circuitry may communicate over wireline, optical or wireless communication mediums. In embodiments in which the system 1700 is configured for wireless communication, the communication circuitry may include the RF circuitry 1714 and/or the baseband circuitry 1712 to provide for communication compatible with one or more radio technologies. For example, in some embodiments, the communication circuitry may support communication with an E-UTRAN and/or other WMANs, a WLAN, and a WPAN.

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (Wi-Fi), various other wireless technologies such as global system for mobile communications (GSM), enhanced data rates for GSM evolution (EDGE), GSM EDGE radio access network (GERAN), universal mobile telecommunications system (UMTS), UMTS Terrestrial Radio Access Network (UTRAN), or other 2G, 3G, 4G, 5G, etc. technologies that are either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Figure 18:
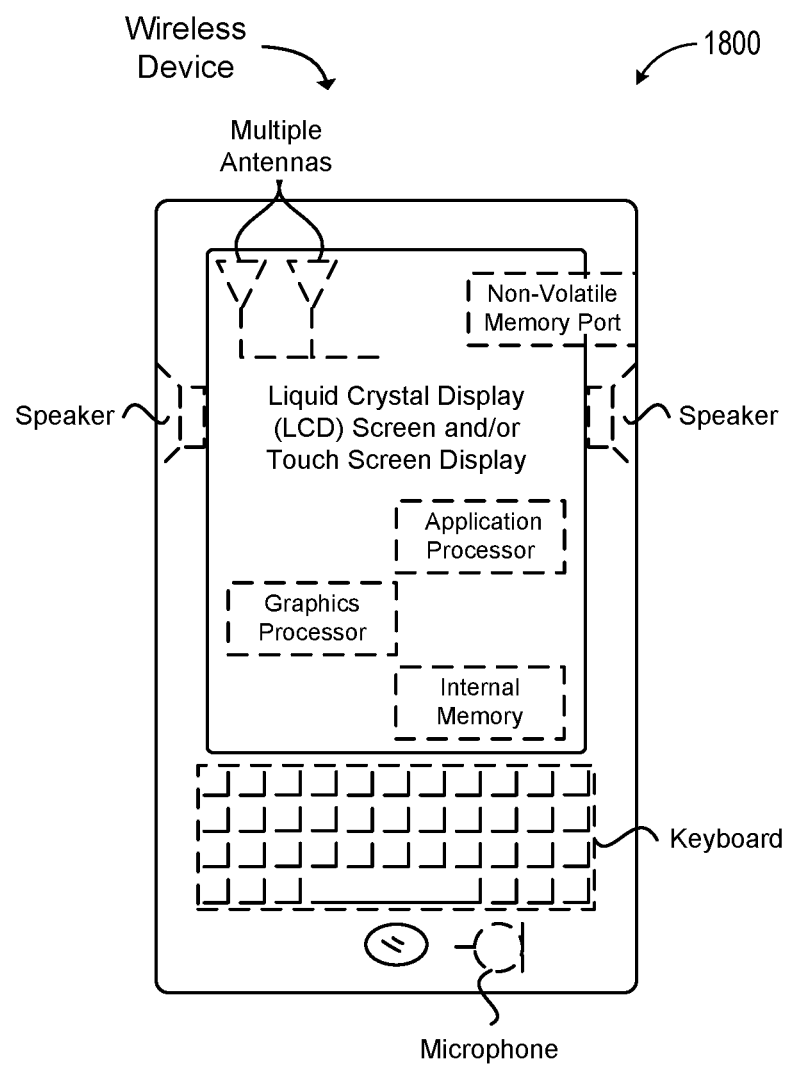
FIG. 18 is an example illustration of a mobile device consistent with embodiments disclosed herein.

FIG. 18 is an example illustration of a mobile device 1800, such as a UE, a mobile station (MS), a mobile wireless device, a mobile communication device, a tablet, a handset, or another type of mobile wireless device. The mobile device 1800 can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device 1800 can be configured to communicate using at least one wireless communication standard including 3GPP LTE, WiMAX, HSPA, Bluetooth, and Wi-Fi. The mobile device 1800 can communicate using separate antennas for each wireless communication standard or shared antennas for multiple wireless communication standards. The mobile device 1800 can communicate in a WLAN, a WPAN, and/or a WWAN.

FIG. 18 also provides an illustration of a microphone and one or more speakers that can be used for audio input and output from the mobile device 1800. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device 1800. A keyboard may be integrated with the mobile device 1800 or wirelessly connected to the mobile device 1800 to provide additional user input. A virtual keyboard may also be provided using the touch screen.

Figure 19:
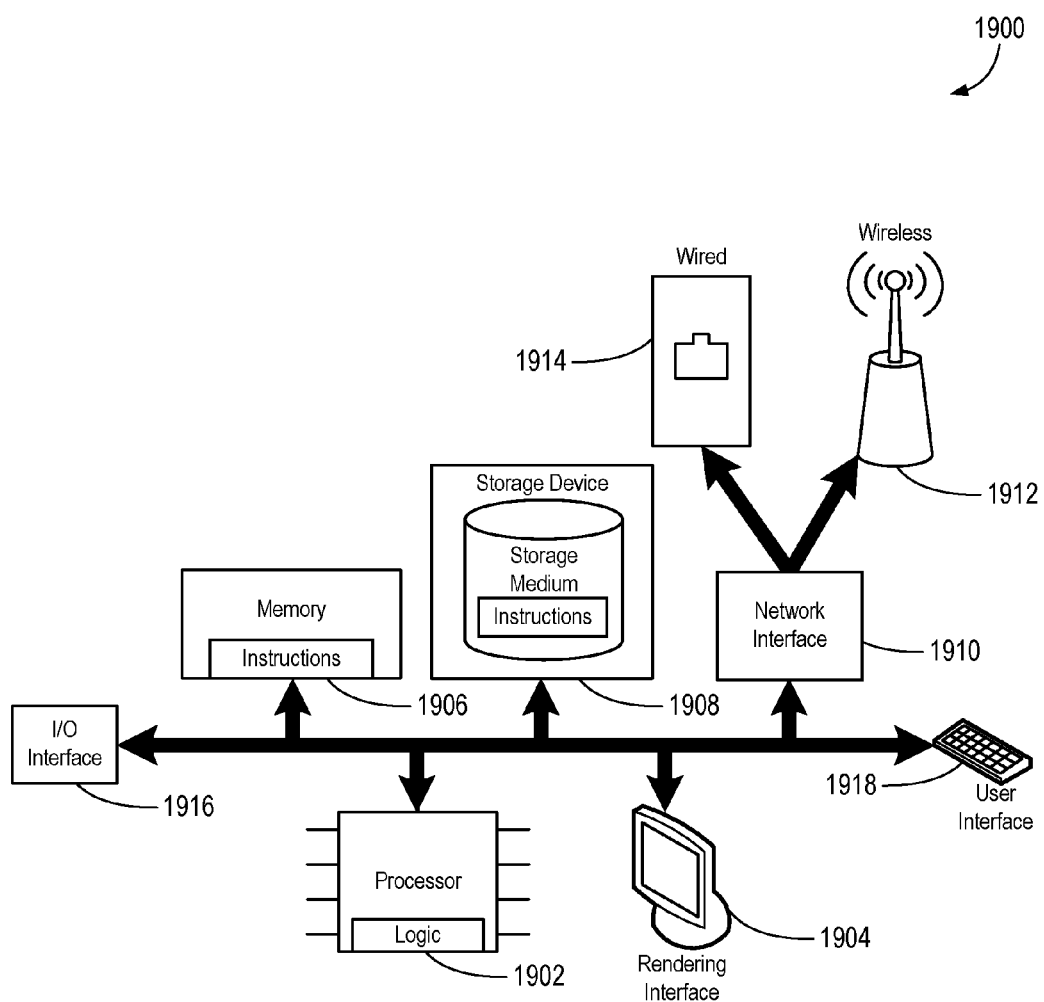
FIG. 19 is a schematic diagram of an alternative computing system consistent with embodiments disclosed herein.

FIG. 19 is a schematic diagram of a computing system 1900. The computing system 1900 can be viewed as an information passing bus that connects various components. In the embodiment shown, the computing system 1900 includes a processor 1902 having logic for processing instructions. Instructions can be stored in and/or retrieved from a memory 1906 and a storage device 1908 that includes a computer-readable storage medium. Instructions and/or data can arrive from a network interface 1910 that can include wired 1914 or wireless 1912 capabilities. Instructions and/or data can also come from an I/O interface 1916 that can include such things as expansion cards, secondary buses (e.g., USB), devices, etc. A user can interact with the computing system 1900 though user interface devices 1918 and a rendering system 1904 that allows the computer to receive and provide feedback to the user.

It should be recognized that the PC5 Signaling Protocol has been used as an example of a PC5 protocol that can be used. Other PC5 protocols can also be used, identified in fields, etc.

EXAMPLES

The following examples pertain to further embodiments.

Example 1 is a user equipment (UE) including a wireless interface, memory and a processor. The wireless interface is configured to communicate directly with a receiving UE using non-IP communication. The memory is configured to store instructions and data. The processor is configured to execute the instructions. The instructions causing the UE to select a non-internet protocol (non-IP) service data unit (SDU) type from a SDU type field in a packet data convergence protocol (PDCP) encapsulate a message in a PDCP data unit using the selected non-IP SDU type and transmit the message to the receiving UE using the PDCP data unit.

In Example 2, the SDU type of Example 1 is optionally wireless access in vehicular environments (WAVE) short message protocol (WSMP).

In Example 3, the SDU type of Example 1 is optionally logical link control/sub-network access protocol (LLC/SNAP).

In Example 4, the LLC/SNAP in Example 3 can optionally be used to encapsulate a message using a PC5 Signaling Protocol.

In Example 5, the SDU type of Example 1 is optionally PC5 Signaling Protocol.

In Example 6, the UE in Example 1 can optionally establish a secure link with the receiving UE using a PC5 protocol, encapsulate the user data in a PC5 protocol message using the PDCP data unit and transmit the PC5 protocol message over the secure link using the PC5 protocol.

In Example 7, the UE in Example 1 can optionally determine an identity of the receiving UE, encapsulate the user data in a PC5 protocol message using the PDCP data unit and transmit the PC5 protocol user data over the secure link using the PC5 protocol.

In Example 8, the UE of Example 1 can optionally determine an identity of the receiving UE, encapsulate the user data in a PC5 protocol message using the PDCP data unit, provide an identifier that enables the receiving UE to extract the user data from the PC5 protocol user data, and transmit the message over the secure link using the PC5 protocol.

In Example 9, the UE of Example 1 can optionally determine an identity of the receiving UE without establishing a layer-2 secure link, encapsulate the message in a PC5 protocol message using the PDCP data unit, provide an asserted public identity of a user of the UE and a digital signature.

In Example 10, the digital signature of Example 9 can optionally use an Elliptic Curve-based Certificateless Signatures for Identity-based Encryption (ECCSI) signature.

In Example 10.5, the UE of Example 9 can optionally provide an encryption key used to encrypt the user data and a key management server identifier.

In Example 11, the encryption key of Example 10.5 is optionally included in a Sakai-Kasahara Key Encryption (SAKKE) payload that is encoded using a public identity of the receiving UE.

In Example 12, the user data of Example 9 can optionally be a non-IP packet.

In Example 13, the user data of Example 9 can optionally be an IP packet.

Example 14 is a circuitry for device to device (D2D) non-internet protocol (non-IP) communication configured to determine whether to negotiate a secure connection with a receiving device. When determined to negotiate the secure connection, the circuitry establishes a secure link with the receiving device using a D2D non-IP protocol, encapsulates the data in a D2D non-IP protocol message and transmits the D2D non-IP protocol message over the secure link using the D2D non-IP protocol. When determined to communicate without negotiating the secure connection, the processor determines an identity of the receiving device, encapsulates the user data in a D2D non-IP protocol message using an identifier that enables the receiving device to extract the data from the D2D non-IP protocol message and transmits the D2D non-IP protocol message over the secure link using the D2D non-IP protocol.

In Example 15, the D2D non-IP protocol of Example 14 is optionally a PC5 Signaling Protocol.

In Example 16, the device of Example 14 can optionally determine an identity of the receiving device without establishing a layer-2 secure link and encapsulate the data in a PC5 protocol message using an asserted public identity of a user of the device, a digital signature, an encryption key used to encrypt the data and a key management server identifier.

In Example 17, the digital signature of Example 22 can optionally use an Elliptic Curve-based Certificateless Signatures for Identity-based Encryption (ECCSI) signature.

In Example 18, the encryption key of Examples 22 can optionally be included in a Sakai-Kasahara Key Encryption (SAKKE) payload that is encoded using a public identity of the receiving device.

In Example 19, the data of Example 22 can optionally be a non-IP packet.

In Example 20, the data of Example 22 can optionally be an IP packet.

Example 21 is a UE configured to receive a message from a transmitting UE using a non-internet protocol (non-IP) protocol, determine a non-IP service data unit (SDU) type from a SDU type field in a packet data convergence protocol (PDCP) header, and decode data in a PDCP data unit using the selected non-IP SDU type.

In Example 22, the SDU type of Example 21 is optionally wireless access in vehicular environments (WAVE) short message protocol (WSMP).

In Example 23, the SDU type of Example 21 is optionally logical link control/sub-network access protocol (LLC/SNAP).

In Example 24, the LLC/SNAP in Example 23 can optionally be used to encapsulate a message using a PC5 protocol.

In Example 25, the SDU type of Example 21 is optionally PC5 Signaling Protocol.

In Example 26, the UE of Example 21 can optionally establish a secure link with the transmitting UE using a PC5 protocol and receive a PC5 protocol message over the secure link using the PC5 protocol.

In Example 27, the UE of Example 21 can optionally receive a PC5 protocol message over a secure link using the PC5 protocol, determine an identity of the transmitting UE and decode the data in a PC5 protocol message based at least in part on the identity of the transmitting UE.

In Example 28, the UE of Example 21 can optionally receive a PC5 protocol message over a secure link using the PC5 protocol and extract an identifier that enables the data to be extracted from the PC5 protocol message.

In Example 29, the UE of Example 21 can optionally receive a PC5 protocol message over a secure link using the PC5 protocol, and extract an asserted public identity of a user of a transmitting UE, a digital signature, an encryption key used to encrypt the data and a key management server identifier from the PC5 protocol message.

In Example 30, the digital signature of Example 29 can optionally use an Elliptic Curve-based Certificateless Signatures for Identity-based Encryption (ECCSI) signature.

In Example 31, the encryption key of Example 29 can optionally be included in a Sakai-Kasahara Key Encryption (SAKKE) payload that is encoded using a public identity of the receiving device.

In Example 32, the data of Example 29 can optionally be a non-IP packet.

In Example 33, the data of Example 29 can optionally be an IP packet.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or internet or IP networks, such as the World Wide Web, a private internet, a secure internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An apparatus for a user equipment (UE) comprising:
memory to store a vehicle to device message;
a processor configured to:
determine that the vehicle to device message is a non-internet protocol (non-IP) message;
encapsulate the non-internet protocol message in a packet data convergence protocol (PDCP) protocol data unit (PDU) that includes a header with a service data unit (SDU) type field;
encode the SDU type field to indicate a non-IP SDU type;
encapsulate the vehicle to device message with an identifier for a vehicle to device protocol;
establish a secure link with a receiving UE using a PC5 interface; and
provide the PDCP PDU for transmission to the receiving UE.

2. The apparatus of claim 1, wherein the vehicle to device protocol is an IEEE 1609 protocol.

3. The apparatus of claim 1, wherein the vehicle to device protocol is a vehicle to vehicle protocol (V2V).

4. The apparatus of claim 1, wherein the vehicle to device protocol is a vehicle to infrastructure protocol (V2I).

5. The apparatus of claim 1, further comprising a wireless interface configured to communicate directly with a receiving UE using vehicle to device messages and non-internet protocol (non-IP) communication.

6. The apparatus of claim 1, wherein the processor is a baseband processor.

7. An apparatus for a user equipment (UE) comprising:
memory to store a non-IP vehicle message;
a processor configured to:
  establish a secure link with a sending UE using a PC5 interface;
  decode a packet data convergence protocol (PDCP) protocol data unit (PDU) header comprising a PDCP service data unit (SDU) type field indicating a non-internet protocol (non-IP) SDU;
  decode the PDCP PDU with the PDCP header to extract a PDCP SDU; and
  decode PDCP SDU to extract a non-IP vehicle message, wherein to decode the PDCP SDU comprises to decode an indicator within the PDCP SDU that identifies the non-IP vehicle message type.

8. The apparatus of claim 7, wherein the non-IP vehicle message type is an wireless access in vehicular environments (WAVE) message.

9. The apparatus of claim 7, wherein the non-IP vehicle message is a vehicle to vehicle (V2V) message.

10. The apparatus of claim 7, wherein to decode the PDCP SDU to extract the non-IP vehicle message further comprises to decode the PDCP SDU using a PC5 protocol based on an indicator of the non-IP vehicle message encoding.

11. The apparatus of claim 10, wherein the processor is further configured to decode the PDCP SDU to form the non-IP vehicle message based on the indicator of the non-IP vehicle message encoding.

12. The apparatus of claim 7, wherein the processor is further configured to establish a secure link with the receiving UE using a PC5 protocol.

13. The apparatus of claim 7, further comprising a wireless interface configured to communicate directly with a transmitting UE using non-internet protocol (non-IP) communication.

14. The apparatus of claim 7, wherein the processor is a baseband processor.

15. A computer program product comprising a non-transitory computer-readable storage medium that stores instructions for execution by a processor to perform operations of a user equipment (UE), the operations, when executed by the processor, to perform a method, the method comprising:
  establish a secure link with a receiving UE using a PC5 interface;
  encapsulating a wireless access in vehicular environments (WAVE) protocol message using a PC5 protocol to form a packet data convergence protocol (PDCP) service data unit (SDU);
  encoding a PDCP protocol data unit (PDU) with a SDU type field indicating an enumerated type of a non-internet protocol (non-IP) message, the PDCP PDU including the IEEE 1609 protocol message; and
  providing the PDCP PDU for transmission.

16. The computer program product of claim 15, wherein providing the PDCP PDU for transmission further comprises providing the PDCP PDU for direct transmission to a receiving UE.

17. The computer program product of claim 15, wherein the IEEE 1609 protocol message is a wireless access in vehicular environments short message protocol (WSMP).

18. The computer program product of claim 15, wherein encapsulating the IEEE 1609 protocol message using the PC5 protocol to form the PDCP SDU further comprises encoding an eight bit identifier to indicate an encapsulation of the IEEE 1609 protocol message.

19. The computer program product of claim 15, wherein encoding the PDCP PDU with the SDU type field indicating an enumerated type of the non-IP message further comprises encoding the SDU type field with an eight bit value that indicates the enumerated type of a non-IP message.

20. The computer program product of claim 15, wherein the receiving UE is a vehicle.

* * * * *